(12) United States Patent
Corson et al.

(10) Patent No.: US 9,313,784 B2
(45) Date of Patent: Apr. 12, 2016

(54) STATE SYNCHRONIZATION OF ACCESS ROUTERS

(71) Applicant: QUALCOMM Incorporated, San Diego, CA (US)

(72) Inventors: Mathew Scott Corson, Gillette, NJ (US); Georgios Tsirtsis, London (GB); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 13/777,458

(22) Filed: Feb. 26, 2013

(65) Prior Publication Data

US 2013/0208709 A1 Aug. 15, 2013

Related U.S. Application Data

(62) Division of application No. 11/486,650, filed on Jul. 14, 2006, now Pat. No. 9,066,344.

(60) Provisional application No. 60/718,363, filed on Sep. 19, 2005, provisional application No. 60/796,653, filed on May 1, 2006.

(51) Int. Cl.
*H04B 7/00* (2006.01)
*H04B 15/00* (2006.01)
(Continued)

(52) U.S. Cl.
CPC ............ *H04W 72/0426* (2013.01); *H04W 8/12* (2013.01); *H04W 40/02* (2013.01); *H04W 60/04* (2013.01)

(58) Field of Classification Search
CPC ............ H04W 56/00; H04W 56/0035; H04W 56/0045; H04W 72/0426; H04W 8/12; H04W 40/02; H04W 60/04; H04W 36/18; H04W 12/06; H04W 36/0038; H04B 7/2693; H04H 20/67; H04L 63/164; H04L 63/123; H04L 9/0891; H04L 9/3247; H04L 9/3239; H04L 45/02; H04L 45/26; H04L 63/08
USPC ................... 455/67.11, 534, 432.1, 524, 502; 370/338, 331, 312, 401, 468, 404
See application file for complete search history.

(56) References Cited

U.S. PATENT DOCUMENTS 4,679,244 A 7/1987 Kawasaki et al.
4,833,701 A 5/1989 Comroe et al.
(Continued)

FOREIGN PATENT DOCUMENTS

AU 2002353616 5/2003
CN 1043052 A 6/1990
(Continued)

OTHER PUBLICATIONS

3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route Des Lucioles, F-06921 Sophia-Antipolis Cedex, France, no. Athens, Greece, Feb. 3, 2009, 16 pgs., XP050318707.

(Continued)

*Primary Examiner* — Mahendra Patel
(74) *Attorney, Agent, or Firm* — Liem T. Do

(57) ABSTRACT

Embodiments describe synchronizing access routers with wireless terminal state information. According to an embodiment is a wireless terminal that transmits a message that includes an address for at least two access routers. State change information can optionally be included in the message. According to another embodiment is an access router that receives a state change notification from a wireless device or another access router. The state change notification is updated in the access router. An acknowledgment confirming the updated state change may be sent to the wireless terminal. Dynamic state synchronization is provided with minimal communication with wireless terminal.

60 Claims, 19 Drawing Sheets

(51) Int. Cl.
*H04W 72/04* (2009.01)
*H04W 8/12* (2009.01)
*H04W 40/02* (2009.01)
*H04W 60/04* (2009.01)

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,095,529 A | 3/1992 | Comroe et al. |
| 5,117,502 A | 5/1992 | Onoda et al. |
| 5,128,938 A | 7/1992 | Borras |
| 5,200,952 A | 4/1993 | Bernstein et al. |
| 5,208,837 A | 5/1993 | Richey |
| 5,210,787 A | 5/1993 | Hayes et al. |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,268,933 A | 12/1993 | Averbuch |
| 5,325,432 A | 6/1994 | Gardeck et al. |
| 5,333,178 A | 7/1994 | Norell |
| 5,369,781 A | 11/1994 | Comroe et al. |
| 5,387,905 A | 2/1995 | Grube et al. |
| 5,388,102 A | 2/1995 | Griffith et al. |
| 5,420,909 A | 5/1995 | Ng et al. |
| 5,426,395 A | 6/1995 | Cygan |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,490,139 A | 2/1996 | Baker et al. |
| 5,491,835 A | 2/1996 | Sasuta et al. |
| 5,509,027 A | 4/1996 | Vook et al. |
| 5,511,232 A | 4/1996 | O'Dea et al. |
| 5,513,381 A | 4/1996 | Sasuta |
| 5,539,925 A | 7/1996 | Yli-Kotila et al. |
| 5,542,108 A | 7/1996 | Sasuta |
| 5,561,841 A | 10/1996 | Markus |
| 5,566,366 A | 10/1996 | Russo et al. |
| 5,572,528 A | 11/1996 | Shuen |
| 5,574,720 A | 11/1996 | Lee |
| 5,590,175 A | 12/1996 | Gallant et al. |
| 5,590,396 A | 12/1996 | Henry |
| 5,594,943 A | 1/1997 | Balachandran |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,694,433 A | 12/1997 | Dent |
| 5,694,548 A | 12/1997 | Baugher et al. |
| 5,722,044 A | 2/1998 | Padovani et al. |
| 5,737,328 A | 4/1998 | Norman et al. |
| 5,794,137 A | 8/1998 | Harte |
| 5,806,007 A | 9/1998 | Raith et al. |
| 5,854,785 A | 12/1998 | Willey |
| 5,870,427 A | 2/1999 | Tiedemann, Jr. et al. |
| 5,884,196 A | 3/1999 | Lekven et al. |
| 5,898,922 A | 4/1999 | Reininghaus |
| 5,901,362 A | 5/1999 | Cheung et al. |
| 5,903,559 A | 5/1999 | Acharya et al. |
| 5,953,653 A | 9/1999 | Josenhans et al. |
| 5,974,036 A | 10/1999 | Acharya et al. |
| 5,978,366 A | 11/1999 | Massingill et al. |
| 5,987,323 A | 11/1999 | Huotari |
| 6,011,969 A | 1/2000 | Vargas et al. |
| 6,016,316 A | 1/2000 | Moura et al. |
| 6,018,521 A | 1/2000 | Timbs et al. |
| 6,021,123 A | 2/2000 | Mimura |
| 6,021,326 A | 2/2000 | Nguyen |
| 6,031,863 A | 2/2000 | Jusa et al. |
| 6,034,950 A | 3/2000 | Sauer et al. |
| 6,043,707 A | 3/2000 | Budnik |
| 6,049,543 A | 4/2000 | Sauer et al. |
| 6,055,236 A | 4/2000 | Nessett et al. |
| 6,055,428 A | 4/2000 | Soliman |
| 6,073,021 A | 6/2000 | Kumar et al. |
| 6,078,575 A | 6/2000 | Dommety et al. |
| 6,084,969 A | 7/2000 | Wright et al. |
| 6,092,111 A | 7/2000 | Scivier et al. |
| 6,094,427 A | 7/2000 | Yi |
| 6,097,952 A | 8/2000 | Kawabata |
| 6,101,394 A | 8/2000 | Illidge |
| 6,134,226 A | 10/2000 | Reed et al. |
| 6,137,787 A | 10/2000 | Chawla et al. |
| 6,144,671 A | 11/2000 | Perinpanathan et al. |
| 6,151,502 A | 11/2000 | Padovani et al. |
| 6,157,668 A | 12/2000 | Gilhousen et al. |
| 6,157,833 A | 12/2000 | Lawson-Jenkins et al. |
| 6,157,978 A | 12/2000 | Ng et al. |
| 6,160,798 A | 12/2000 | Reed et al. |
| 6,161,008 A | 12/2000 | Lee et al. |
| 6,163,692 A | 12/2000 | Chakrabarti et al. |
| 6,195,552 B1 | 2/2001 | Jeong et al. |
| 6,195,705 B1 | 2/2001 | Leung |
| 6,201,971 B1 | 3/2001 | Purnadi et al. |
| 6,225,888 B1 | 5/2001 | Juopperi |
| 6,256,300 B1 | 7/2001 | Ahmed et al. |
| 6,272,129 B1 | 8/2001 | Dynarski et al. |
| 6,275,712 B1 | 8/2001 | Gray et al. |
| 6,285,251 B1 | 9/2001 | Dent et al. |
| 6,285,665 B1 | 9/2001 | Chuah |
| 6,300,887 B1 | 10/2001 | Le |
| 6,308,080 B1 | 10/2001 | Burt et al. |
| 6,308,267 B1 | 10/2001 | Gremmelmaier |
| 6,345,043 B1 | 2/2002 | Hsu |
| 6,347,091 B1 | 2/2002 | Wallentin et al. |
| 6,353,616 B1 | 3/2002 | Elwalid et al. |
| 6,360,100 B1 | 3/2002 | Grob et al. |
| 6,366,561 B1 | 4/2002 | Bender |
| 6,366,577 B1 | 4/2002 | Donovan |
| 6,370,380 B1 | 4/2002 | Norefors et al. |
| 6,389,008 B1 | 5/2002 | Lupien et al. |
| 6,397,065 B1 | 5/2002 | Huusko et al. |
| 6,400,703 B1 | 6/2002 | Park et al. |
| 6,400,722 B1 | 6/2002 | Chuah et al. |
| 6,430,213 B1 | 8/2002 | Dafesh |
| 6,434,134 B1 | 8/2002 | La Porta et al. |
| 6,445,922 B1 | 9/2002 | Hiller et al. |
| 6,446,127 B1 | 9/2002 | Schuster et al. |
| 6,449,481 B1 | 9/2002 | Kwon et al. |
| 6,456,604 B1 | 9/2002 | Lee et al. |
| 6,463,055 B1 | 10/2002 | Lupien et al. |
| 6,466,964 B1 | 10/2002 | Leung et al. |
| 6,473,418 B1 | 10/2002 | Laroia et al. |
| 6,477,150 B1 | 11/2002 | Maggenti et al. |
| 6,487,170 B1 | 11/2002 | Chen et al. |
| 6,487,407 B2 | 11/2002 | Goldberg et al. |
| 6,490,564 B1 | 12/2002 | Dodrill et al. |
| 6,493,725 B1 | 12/2002 | Iwai et al. |
| 6,496,505 B2 | 12/2002 | La Porta et al. |
| 6,496,704 B2 | 12/2002 | Yuan |
| 6,498,934 B1 | 12/2002 | Muller |
| 6,505,047 B1 | 1/2003 | Palkisto |
| 6,510,144 B1 | 1/2003 | Dommety et al. |
| 6,510,153 B1 | 1/2003 | Inoue et al. |
| 6,512,754 B2 | 1/2003 | Feder et al. |
| 6,516,352 B1 | 2/2003 | Booth et al. |
| 6,519,254 B1 | 2/2003 | Chuah et al. |
| 6,519,457 B1 | 2/2003 | Jiang et al. |
| 6,529,732 B1 | 3/2003 | Vainiomaki et al. |
| 6,535,493 B1 | 3/2003 | Lee et al. |
| 6,535,739 B1 | 3/2003 | Chen et al. |
| 6,539,225 B1 | 3/2003 | Lee |
| 6,546,252 B1 | 4/2003 | Jetzek et al. |
| 6,553,227 B1 | 4/2003 | Ho et al. |
| 6,563,919 B1 | 5/2003 | Aravamudhan et al. |
| 6,567,416 B1 | 5/2003 | Chuah |
| 6,567,664 B1 | 5/2003 | Bergenwall et al. |
| 6,571,095 B1 | 5/2003 | Koodli |
| 6,571,289 B1 | 5/2003 | Montenegro |
| 6,578,085 B1 | 6/2003 | Khalil et al. |
| 6,584,093 B1 | 6/2003 | Salama et al. |

(56) References Cited

U.S. PATENT DOCUMENTS

| | | |
|---|---|---|
| 6,587,680 B1 * | 7/2003 | Ala-Laurila ............ H04L 63/08 380/248 |
| 6,611,506 B1 | 8/2003 | Huang et al. |
| 6,611,547 B1 | 8/2003 | Rauhala |
| 6,615,236 B2 | 9/2003 | Donovan et al. |
| 6,631,122 B1 | 10/2003 | Arunachalam et al. |
| 6,631,254 B1 | 10/2003 | Wilson et al. |
| 6,636,498 B1 | 10/2003 | Leung |
| 6,640,248 B1 | 10/2003 | Jorgensen |
| 6,650,901 B1 | 11/2003 | Schuster et al. |
| 6,654,363 B1 | 11/2003 | Li et al. |
| 6,668,166 B1 | 12/2003 | Kanabar |
| 6,671,512 B2 | 12/2003 | Laakso |
| 6,678,735 B1 | 1/2004 | Orton et al. |
| 6,680,943 B1 | 1/2004 | Gibson et al. |
| 6,690,936 B1 | 2/2004 | Lundh |
| 6,701,155 B2 | 3/2004 | Sarkkinen et al. |
| 6,708,031 B2 | 3/2004 | Purnadi et al. |
| 6,714,524 B1 | 3/2004 | Kim et al. |
| 6,714,777 B1 | 3/2004 | Naqvi et al. |
| 6,714,788 B2 | 3/2004 | Voyer |
| 6,724,267 B2 | 4/2004 | Kim |
| 6,728,365 B1 | 4/2004 | Li et al. |
| 6,731,932 B1 | 5/2004 | Rune et al. |
| 6,754,482 B1 | 6/2004 | Torabi |
| 6,754,492 B1 | 6/2004 | Stammers et al. |
| 6,763,007 B1 | 7/2004 | La Porta et al. |
| 6,768,908 B1 | 7/2004 | Jalloul et al. |
| 6,771,962 B2 | 8/2004 | Saifullah et al. |
| 6,785,256 B2 | 8/2004 | O'neill |
| 6,807,421 B1 | 10/2004 | Ahmavaara |
| 6,842,621 B2 | 1/2005 | Labun et al. |
| 6,842,630 B2 | 1/2005 | Periyalwar |
| 6,862,446 B2 | 3/2005 | ONeill et al. |
| 6,879,690 B2 | 4/2005 | Faccin et al. |
| 6,901,063 B2 | 5/2005 | Vayanos et al. |
| 6,917,605 B2 | 7/2005 | Kakemizu et al. |
| 6,937,566 B1 | 8/2005 | Forslow |
| 6,947,401 B2 | 9/2005 | El-Malki et al. |
| 6,950,650 B2 | 9/2005 | Roeder |
| 6,954,442 B2 | 10/2005 | Tsirtsis et al. |
| 6,961,579 B2 | 11/2005 | Inukai et al. |
| 6,965,585 B2 | 11/2005 | Grilli et al. |
| 6,970,445 B2 | 11/2005 | O'neill et al. |
| 6,990,088 B2 | 1/2006 | Madour |
| 6,990,337 B2 | 1/2006 | ONeill et al. |
| 6,990,339 B2 | 1/2006 | Turanyi et al. |
| 6,990,343 B2 | 1/2006 | Lefkowitz |
| 6,992,994 B2 | 1/2006 | Das et al. |
| 6,993,332 B2 | 1/2006 | Pedersen et al. |
| 6,996,379 B2 | 2/2006 | Khorram |
| 7,003,311 B2 | 2/2006 | Ebata et al. |
| 7,006,826 B2 | 2/2006 | Cao et al. |
| 7,016,317 B1 | 3/2006 | Pathak et al. |
| 7,027,400 B2 | 4/2006 | O'Neill |
| 7,027,449 B2 | 4/2006 | Garcia-Luna-Aceves et al. |
| 7,047,009 B2 | 5/2006 | Laroia et al. |
| 7,068,640 B2 | 6/2006 | Kakemizu et al. |
| 7,068,654 B1 | 6/2006 | Joseph et al. |
| 7,069,040 B2 | 6/2006 | Iwanaga et al. |
| 7,079,511 B2 | 7/2006 | Abrol et al. |
| 7,089,008 B1 | 8/2006 | Back et al. |
| 7,096,014 B2 | 8/2006 | Haverinen et al. |
| 7,110,727 B2 | 9/2006 | Dekker |
| 7,116,646 B1 | 10/2006 | Gustafson et al. |
| 7,116,654 B2 | 10/2006 | Kim |
| 7,123,599 B2 | 10/2006 | Yano et al. |
| 7,130,291 B2 | 10/2006 | Kim et al. |
| 7,133,456 B2 | 11/2006 | Feher |
| 7,139,548 B2 | 11/2006 | Hayashi et al. |
| 7,155,236 B2 | 12/2006 | Chen et al. |
| 7,161,913 B2 | 1/2007 | Jung |
| 7,167,447 B2 | 1/2007 | Puuskari et al. |
| 7,177,641 B1 | 2/2007 | Miernik et al. |
| 7,184,771 B1 | 2/2007 | Mouly et al. |
| 7,187,928 B1 | 3/2007 | Senn et al. |
| 7,197,318 B2 | 3/2007 | Schwarz et al. |
| 7,233,583 B2 | 6/2007 | Asthana et al. |
| 7,233,794 B2 | 6/2007 | Grob et al. |
| 7,257,402 B2 | 8/2007 | Khalil et al. |
| 7,263,357 B2 | 8/2007 | Lee et al. |
| 7,266,100 B2 | 9/2007 | Le et al. |
| 7,269,145 B2 | 9/2007 | Koo et al. |
| 7,272,122 B2 | 9/2007 | Trossen et al. |
| 7,283,495 B2 | 10/2007 | Lee et al. |
| 7,283,511 B2 | 10/2007 | Hans et al. |
| 7,290,063 B2 | 10/2007 | Kalliokulju et al. |
| 7,292,592 B2 | 11/2007 | Rune |
| 7,315,554 B2 | 1/2008 | Baum et al. |
| 7,330,542 B2 | 2/2008 | Kauhanen et al. |
| 7,333,452 B2 | 2/2008 | Lim |
| 7,336,753 B2 | 2/2008 | Hasson et al. |
| 7,336,953 B2 | 2/2008 | Kim et al. |
| 7,369,855 B2 | 5/2008 | ONeill et al. |
| 7,369,859 B2 | 5/2008 | Gallagher |
| 7,376,101 B2 | 5/2008 | Shim et al. |
| 7,389,110 B2 | 6/2008 | Lee |
| 7,391,741 B2 | 6/2008 | Kang |
| 7,403,789 B2 | 7/2008 | Takano et al. |
| 7,408,917 B1 | 8/2008 | Kyung et al. |
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,525,940 B2 | 4/2009 | Trossen et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | ONeill et al. |
| 7,672,254 B2 | 3/2010 | Kim et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |
| 7,773,947 B2 | 8/2010 | Gerlach |
| 7,869,803 B2 | 1/2011 | Corson et al. |
| 7,882,346 B2 | 2/2011 | ONeill et al. |
| 7,962,142 B2 | 6/2011 | O'neill et al. |
| 8,112,102 B2 | 2/2012 | Fischer |
| 8,134,976 B2 | 3/2012 | Wallace et al. |
| 8,144,664 B2 | 3/2012 | Pani et al. |
| 8,165,587 B2 | 4/2012 | Dahlen et al. |
| 8,184,615 B2 | 5/2012 | Tsirtsis et al. |
| 8,229,120 B2 | 7/2012 | Iwamura et al. |
| 8,509,799 B2 | 8/2013 | Park et al. |
| 8,583,044 B2 | 11/2013 | Dua |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0114308 A1 | 8/2002 | Takano et al. |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 * | 11/2002 | Sorokine ............... H04W 36/18 455/442 |
| 2002/0186679 A1 | 12/2002 | Nakatsugawa et al. |
| 2002/0199012 A1 | 12/2002 | Cable et al. |
| 2003/0009580 A1 | 1/2003 | Chen et al. |
| 2003/0009582 A1 | 1/2003 | Qiao et al. |
| 2003/0018774 A1 | 1/2003 | Flinck et al. |

(56) References Cited

U.S. PATENT DOCUMENTS

| | | |
|---|---|---|
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0051140 A1 | 3/2003 | Buddhikot et al. |
| 2003/0071417 A1 | 4/2003 | Webb |
| 2003/0078047 A1 | 4/2003 | Lee et al. |
| 2003/0092441 A1 | 5/2003 | Taha et al. |
| 2003/0092444 A1 | 5/2003 | Sengodan et al. |
| 2003/0101307 A1 | 5/2003 | Gemelli et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0119516 A1 | 6/2003 | Tomishima et al. |
| 2003/0137991 A1 | 7/2003 | Doshi et al. |
| 2003/0204599 A1 | 10/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2003/0236103 A1 | 12/2003 | Tamaki et al. |
| 2004/0002362 A1 | 1/2004 | Chuah et al. |
| 2004/0003070 A1* | 1/2004 | Fernald ............... H04L 12/2602 709/223 |
| 2004/0004736 A1 | 1/2004 | Ogura et al. |
| 2004/0004967 A1 | 1/2004 | Nakatsugawa et al. |
| 2004/0008630 A1 | 1/2004 | Corson et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0037264 A1 | 2/2004 | Khawand |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0192390 A1 | 9/2004 | Tajima |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0014509 A1 | 1/2005 | Semper et al. |
| 2005/0020262 A1 | 1/2005 | Kim |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063324 A1* | 3/2005 | O'Neill ............... H04L 12/2856 370/310 |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0090260 A1 | 4/2005 | Semper et al. |
| 2005/0128949 A1 | 6/2005 | Ku et al. |
| 2005/0128990 A1 | 6/2005 | Eom et al. |
| 2005/0141468 A1 | 6/2005 | Kim et al. |
| 2005/0143072 A1 | 6/2005 | Yoon et al. |
| 2005/0201324 A1 | 9/2005 | Zheng |
| 2005/0265303 A1 | 12/2005 | Edwards et al. |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum, Jr. et al. |
| 2006/0029028 A1 | 2/2006 | Kim et al. |
| 2006/0036733 A1* | 2/2006 | Fujimoto ............ H04L 61/2015 709/225 |
| 2006/0056348 A1 | 3/2006 | Marinier et al. |
| 2006/0067526 A1 | 3/2006 | Faccin et al. |
| 2006/0069809 A1 | 3/2006 | Serlet |
| 2006/0089141 A1 | 4/2006 | Ho et al. |
| 2006/0099948 A1 | 5/2006 | Hoghooghi et al. |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0159082 A1* | 7/2006 | Cook ..................... H04L 45/02 370/389 |
| 2006/0183479 A1 | 8/2006 | Liu et al. |
| 2006/0217119 A1 | 9/2006 | Bosch et al. |
| 2006/0221883 A1 | 10/2006 | Damnjanovic et al. |
| 2006/0230019 A1 | 10/2006 | Hill et al. |
| 2006/0268924 A1 | 11/2006 | Marinier et al. |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1 | 5/2007 | Kim |
| 2007/0105555 A1 | 5/2007 | Miernik et al. |
| 2007/0105584 A1 | 5/2007 | Grob et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0149126 A1 | 6/2007 | Rangan et al. |
| 2007/0149194 A1 | 6/2007 | Das et al. |
| 2007/0171875 A1 | 7/2007 | Suda |
| 2007/0189282 A1 | 8/2007 | Lohr et al. |
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0019293 A1 | 1/2008 | Chang et al. |
| 2008/0031198 A1 | 2/2008 | Hwang et al. |
| 2008/0051091 A1 | 2/2008 | Phan et al. |
| 2008/0074994 A1 | 3/2008 | Jen |
| 2008/0076424 A1 | 3/2008 | Barber et al. |
| 2008/0089287 A1 | 4/2008 | Sagfors et al. |
| 2008/0146231 A1 | 6/2008 | Huang et al. |
| 2008/0160999 A1 | 7/2008 | Eklund |
| 2008/0240039 A1 | 10/2008 | Parekh |
| 2008/0242292 A1 | 10/2008 | Koskela et al. |
| 2008/0253332 A1 | 10/2008 | Ore et al. |
| 2008/0259855 A1 | 10/2008 | Yoon et al. |
| 2008/0261600 A1 | 10/2008 | Somasundaram et al. |
| 2009/0029706 A1 | 1/2009 | Prakash |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1 | 7/2009 | Venkitaraman |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2010/0080126 A1 | 4/2010 | Higashida |
| 2011/0019614 A1 | 1/2011 | ONeill et al. |
| 2011/0039546 A1 | 2/2011 | Narasimha et al. |
| 2011/0039552 A1 | 2/2011 | Narasimha et al. |
| 2011/0051660 A1 | 3/2011 | Arora et al. |
| 2011/0103347 A1 | 5/2011 | Dimou |
| 2011/0250892 A1 | 10/2011 | Gupta et al. |
| 2011/0268085 A1 | 11/2011 | Barany et al. |
| 2012/0087312 A1 | 4/2012 | Laroia et al. |
| 2012/0327908 A1 | 12/2012 | Gupta et al. |

(56) References Cited

U.S. PATENT DOCUMENTS

| | | | |
|---|---|---|---|
| 2013/0294324 A1 | 11/2013 | Corson et al. | |
| 2015/0030003 A1 | 1/2015 | O'Neill et al. | |

FOREIGN PATENT DOCUMENTS

| | | | |
|---|---|---|---|
| CN | 1344477 | A | 4/2002 |
| CN | 1345518 | A | 4/2002 |
| CN | 1416284 | A | 5/2003 |
| CN | 1481119 | A | 3/2004 |
| CN | 1490959 | A | 4/2004 |
| CN | 1514607 | | 7/2004 |
| CN | 1553741 | | 12/2004 |
| CN | 1859529 | A | 11/2006 |
| EP | 0740440 | A2 | 10/1996 |
| EP | 0813346 | A1 | 12/1997 |
| EP | 0974895 | A2 | 1/2000 |
| EP | 1088463 | A1 | 4/2001 |
| EP | 1128704 | A1 | 8/2001 |
| EP | 1138173 | A1 | 10/2001 |
| EP | 1244261 | A2 | 9/2002 |
| EP | 1345370 | A2 | 9/2003 |
| EP | 0926608 | B1 | 3/2004 |
| EP | 1458209 | A2 | 9/2004 |
| EP | 1473872 | A2 | 11/2004 |
| EP | 1489808 | A2 | 12/2004 |
| EP | 1507421 | A1 | 2/2005 |
| EP | 1565024 | A2 | 8/2005 |
| EP | 1720267 | A1 | 11/2006 |
| EP | 1764942 | A2 | 3/2007 |
| GB | 2322046 | | 8/1998 |
| GB | 2395629 | A | 5/2004 |
| JP | 2084807 | | 3/1990 |
| JP | 08116329 | | 5/1996 |
| JP | 11308273 | | 11/1999 |
| JP | H11341541 | A | 12/1999 |
| JP | 2000125343 | A | 4/2000 |
| JP | 2001507897 | T | 6/2001 |
| JP | 2001217830 | A | 8/2001 |
| JP | 2001237878 | A | 8/2001 |
| JP | 2001245355 | A | 9/2001 |
| JP | 2002111732 | A | 4/2002 |
| JP | 2002513527 | A | 5/2002 |
| JP | 2002165249 | A | 6/2002 |
| JP | 2002281069 | A | 9/2002 |
| JP | 2002281539 | A | 9/2002 |
| JP | 2002533030 | T | 10/2002 |
| JP | 2002537739 | | 11/2002 |
| JP | 2003060685 | A | 2/2003 |
| JP | 2003111134 | A | 4/2003 |
| JP | 2003348007 | | 5/2003 |
| JP | 2003304571 | A | 10/2003 |
| JP | 2003338833 | A | 11/2003 |
| JP | 2004007578 | A | 1/2004 |
| JP | 2004506358 | T | 2/2004 |
| JP | 2004104544 | A | 4/2004 |
| JP | 2004147228 | | 5/2004 |
| JP | 2004187256 | A | 7/2004 |
| JP | 2004201289 | A | 7/2004 |
| JP | 2004297130 | A | 10/2004 |
| JP | 2004328637 | A | 11/2004 |
| JP | 2004328727 | A | 11/2004 |
| JP | 2005531173 | T | 10/2005 |
| JP | 2007527177 | T | 9/2007 |
| JP | 2008053889 | A | 3/2008 |
| JP | 4827994 | B1 | 11/2011 |
| KR | 20040004918 | A | 1/2004 |
| KR | 20040105069 | A | 12/2004 |
| KR | 20050023194 | A | 3/2005 |
| KR | 20050065123 | | 6/2005 |
| KR | 20050066287 | A | 6/2005 |
| KR | 20070031810 | A | 3/2007 |
| RU | 2117396 | C1 | 8/1998 |
| RU | 2256299 | C2 | 7/2005 |
| RU | 2292669 | | 1/2007 |
| RU | 2294596 | C2 | 2/2007 |
| TW | 200527930 | | 8/2005 |
| WO | 9501706 | A1 | 1/1995 |
| WO | WO-9627993 | A1 | 9/1996 |
| WO | WO-9712475 | A1 | 4/1997 |
| WO | 9804094 | A1 | 1/1998 |
| WO | 9833288 | | 7/1998 |
| WO | 9847302 | | 10/1998 |
| WO | 9856140 | A2 | 12/1998 |
| WO | 9905828 | A1 | 2/1999 |
| WO | 9927718 | | 6/1999 |
| WO | 9966748 | A1 | 12/1999 |
| WO | 0041426 | A1 | 7/2000 |
| WO | 0128160 | A2 | 4/2001 |
| WO | 0158196 | A1 | 8/2001 |
| WO | 0163947 | | 8/2001 |
| WO | 0219746 | A1 | 3/2002 |
| WO | 0243409 | A2 | 5/2002 |
| WO | 02056551 | A1 | 7/2002 |
| WO | 03007484 | A2 | 1/2003 |
| WO | 03017582 | | 2/2003 |
| WO | 03092316 | A1 | 11/2003 |
| WO | 03098816 | A2 | 11/2003 |
| WO | 03105516 | A1 | 12/2003 |
| WO | 2004039022 | A2 | 5/2004 |
| WO | 2004068739 | A1 | 8/2004 |
| WO | 2004079949 | A1 | 9/2004 |
| WO | 2004105272 | A1 | 12/2004 |
| WO | 2004107638 | A2 | 12/2004 |
| WO | 2004114695 | A1 | 12/2004 |
| WO | 2005048629 | A1 | 5/2005 |
| WO | 2005078966 | A1 | 8/2005 |
| WO | 2005084146 | A2 | 9/2005 |
| WO | 2005120183 | A2 | 12/2005 |
| WO | 2006002676 | A1 | 1/2006 |
| WO | WO-2006020105 | A1 | 2/2006 |
| WO | 2006083131 | A1 | 8/2006 |
| WO | 2008113373 | A1 | 9/2008 |
| WO | 2008131401 | A1 | 10/2008 |

OTHER PUBLICATIONS

3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)", version 0.0.1, Release 8, year 2007, pp. 9.

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822, [retrieved on Jan. 7, 2010].

Baker, F., IETF, "RSVP Management Information Base Using SMIv2," Network Working Group, Request for Comments: 2206, pp. 1-64 (Sep. 1997).

Basic Knowledge of Communications Term of Switching HUB, Nov. 9. 2006, 2 pgs.

Berger, L., et al., "RSVP Extensions for IPSEC Data Flows," IETF, Network Working Group, Request for Comments: 2207, pp. 1-14 (Sep. 1997).

Berger, L., "RSVP Refresh Overhead Reduction Extensions," IETF Network Working Group, Request for Comments: 2961, pp. 1-34 (Apr. 2001).

Bos et al., "A Framework for End-to-End Perceived Quality of Service Negotiation", IETF Internal Draft, draft-bos-mmusic-sdpqos-framework-00.txt, Nov. 2001, pp. 1-22.

(56) References Cited

OTHER PUBLICATIONS

Braden, R., "Resource ReSerVation Protocol (RSVP)—Ver. 1, Message Processing Rules," IETF, Network Working Group, Request for Comments: 2209, pp. 1-25 (Sep. 1997).
Braden, R., "Resource ReSerVation Protocol (RSVP)—Ver. 1 Functional Specification". IETF, Network Working Group, Request for Comments: 2205, pp. 1-112 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).
Co-pending U.S. Appl. No. 08/144,901, filed Oct. 28, 1993.
Droms, R.: "Dynamic Host Configuration Protocol," IETF Standard, RFC 2131, Internet Engineering Task Force, IETF, CH, pp. 1-45, (Mar. 1997) XP015007915.
Etri, "Source Specific Multicast (SSM) Explicit Multicast (Xcast)" pp. 1-27 (Jun. 28, 2001).
Ho, Michael. "Integration AAA with Mobile IPv4", Internet Draft, pp. 1-59, Apr. 2002.
Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20100222, Mar. 4, 2010, XP050422194, 3 pgs. [retrieved on Mar. 4, 2010].
Ian F.A., et al., "Mobility Management in Next-Generation Wireless Systems", Proceedings of the IEEE, IEEE. New York, us, vol. 87, No. 8, Aug. 1, 1999, XP011044241, ISSN: 0018-9219, pp. 1347-1384.
International Search Report dated Feb. 22, 2007 for PCT/US2006/036580.
Johnson, D., et al., IETF Mobile IP Working Group, "Mobility Support in IPv6,"; Feb. 26, 2003 Downloaded from http://www.join.uni-muenster.de on Dec. 29, 2004, pp. 1-169.
Karagiannis, Georgios. "Mobile IP: State of the Art Report," Ericsson, No. 3/0362-FCP NB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-had column, last paragraph—p. 3, left-hand column, paragraph 3 p. 5, right-hand column, last paragraph—p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D., et al., "Analysis of master-slave protocols for real-time industrial communications over IEEE 802.11 WLANs" Industrial Informatics, 2004. Indin '04, 2nd IEEE International Conference on Berlin, Germany Jun. 24-26, 2004. Piscataway, NJ, USA IEEE, June 24, 2004, pp. 143-148, XP010782619, ISBN 0789385136, Para 3, point B.
Mockapetris P., "Domain Names—Implentation and Specification", IETF RFC 1035, Nov. 1987.
Moy, J., "OSPF Version 2", Network Working Group, Request for Comments: 2328, pp. 1-244 (Apr. 1998).

"Network Layer Protocol," Jul. 13, 2002, chap. 6, pp. 1-35, URL: http://www2.yamanashi-ken.ac.jp/~itoyo/lecture/network/network06/index06.htm.
Nortel: "Forward Hand-Off options", R2-071980, 3GPP TSG-RAN WG2 Meeting #58, Kobe, Japan, May 7-11, 2007, sections 2-3.
Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. RAN WG2, no. Tallinn, Aug. 23, 2006, XP050131764.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Pollini, G P et al., "Trends in Handover Design" IEEE 34(3), pp. 82-90, Mar. 1, 1996, XP00557380.
Rosenberg J et al:RFAC 3261: "SIP: Session Initiation Protocol" 20020600, Jun. 1, 2002, pp. 1-269, XP015009039.
Schulzrinne et al., "Application-Layer Mobility Using SIP", 0-7803-7133 IEEE, pp. 29-36, Jan. 2000.
Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129-134.
"Terms for Use in Textbooks and Lectures on Distributed Computing," Feb. 13, 2005, URL: http://web.archive.org/web/20050213090736/http://www.nuis.ac.jp/~nagai/lecture/dce.html.
Thulasi, A., et al., "IPv6 Prefix Delegation Using ICMPv6", Network Working Group, Hewlett-Packard, pp. 1-34, Apr. 2004.
TIA/EIA/IS-707A.8 "Data Service Options for Spread Spectrum Systems: Radio Link Protocol Type 2" pp. 1-1:4:12 (Mar. 1999).
Trossen, D. et al., "A Dynamic Protocol for Candidate Access-Router Discovery", 35 pgs., Mar. 14, 2003.
Valko, A.G. et al.: "Cellular IP: A New Approach to Internet Host Mobility" Computer Communication Review, Association for Computing Machinery. New York, USvol. 29, No. 1, Jan. 1999, pp. 50-65, XP000823873 ISSN: 0146-4833, p. 56, Line 7-Line13.
Wedlund et al: "Mobility Support Using SIP", Proc. of ACM/IEEE International Conference on Wireless and Mobile Multimedia (WoWMoM '99), Seattle, Washington, Aug. 1999.
Written Opinion—PCT/US2006/036580, International Search Authority, European Patent Office, Jun. 20, 2006.
Wroclawski, J., "The Use of RSVP with IETF Integrated Services," IETF, Network Working Group, Request for Comments: 2210, pp. 1-33 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
Zte, et al., "Handover Cause Report for Mobility Robustness Optimization", 3GPP Draft; R3-092982, 3rd Generation Partnership Project (3GPP), Mobile Competence Centre ; 650, Route Des Lucioles ; F-06921 Sophia-Antipolis Cedex ; France, no. Jeju; Nov. 9, 2009, XP050392455, 4 pgs. [retrieved on Nov. 19, 2009].
Evolved Universal Terrestrial Radio Access (E-UTRA) and Evolved Universal Terrestrial Radio Access Network (E-UTRAN); Overall description; Stage 2 (Release 9), 3GPP TS 36.300 V9.2.0, Dec. 2009, pp. 56-61, Retrieved from the internet: URL: http://www.3gpp.org/ftp/Specs/archive/36_series/36.300/36300-920.zip.
Qualcomm Europe, T-Mobile, "Network based solutions to inbound mobility in the presence of PCI confusion", 3GPP TSG-RAN WG3 #64, R3-091027, May 2008, pp. 1-4, Retrieved from the internet: URL: http://www.3gpp.org/ftp/tsg_ran/WG3_lu/TSGR3_64/Docs/R3-091027.zip.
Qualcomm Incorporated, "UE context fetch procedure stage 2", 3GPP TSG-RAN WG3 Meeting #67, R3-100893, Feb. 2010, pp. 1-4, Retrieved from the internet URL: http://www.3gpp.org/ftp/tsg_ran/WG3_lu/TSGR3_67/Docs/R3-100893.zip.

(56) References Cited

OTHER PUBLICATIONS

Aboba, et al., "The Network Access Identifier, Request for Comments (RFC) 2486," 1999, 8.
Becker, et al., "RF Power Control in GSM Systems for Constant and Non Constant Envelope Modulation Schemes, ISCAS," Proceedings of 2003 Initial Symptoms on Circuits and Systems, 2003, 3, III-602 to III-605.
"SIP: Session Iniitiation Protocol", IETF Network Group, Requests for Comments: 3261, (Jun. 2002), pp. 1-29.
Liang et al: "Nonlinear amplifier Effects in Communications Systems," IEEE Trans. On Microwave Theory and Techniques, vol. 47, No. 8, Aug. 1999, pp. 1461-1466.
NetworkWorking Group, IPv6 Prefix Delegation Using ICMPv6, pp. 1-33, Apr. 2004.

* cited by examiner

STATE SYNCHRONIZATION OF ACCESS ROUTERS

CROSS-REFERENCE

This application is a divisional of U.S. patent application Ser. No. 11/486,650, filed Jul. 14, 2006 and entitled "STATE SYNCHRONIZATION OF ACCESS ROUTERS" which claims priority to U.S. Provisional Patent Application Ser. No. 60/718,363, filed Sep. 19, 2005 and entitled "METHODS AND APPARATUS FOR THE UTILIZATION OF MOBILE NODES FOR STATE TRANSFER AS PART OF A HAND-OFF OPERATION"; and U.S. Provisional Patent Application Ser. No. 60/796,653, filed on May 1, 2006 and entitled "A METHOD AND APPARATUS FOR MOBILITY AWARE RESOURCE CONTROL" (Park). This application is also related to U.S. patent application Ser. No. 11/288,597, filed Nov. 29, 2005 and entitled "METHODS AND APPARATUS FOR THE UTILIZATION OF MOBILE NODES FOR STATE TRANSFER"; U.S. patent application Ser. No. 11/316,602, filed Dec. 22, 2005 and entitled "COMMUNICATIONS METHODS AND APPARATUS USING PHYSICAL ATTACHMENT POINT IDENTIFIERS"; U.S. patent application Ser. No. 11/316,376, filed Dec. 22, 2005 and entitled "COMMUNICATIONS METHODS AND APPARATUS USING PHYSICAL ATTACHMENT POINT IDENTIFIERS WHICH SUPPORT DUAL COMMUNICATIONS LINK"; U.S. patent application Ser. No. 11/316,603, filed Dec. 22, 2005 and entitled "METHOD AND APPARATUS FOR END NODE ASSISTED NEIGHBOR DISCOVER"; and U.S. Pat. No. 6,862,446, filed Feb. 18, 2003 and entitled "METHODS AND APPARATUS FOR THE UTILIZATION OF CORE BASED NODES FOR STATE TRANSFER." This application is additionally related to the following co-filed patent applications: U.S. patent application Ser. No. 11/487,446, filed Jul. 14, 2006, entitled "PROVISION OF A MOVE INDICATION TO A RESOURCE REQUESTER" (Park, et al.); U.S. patent application Ser. No. 11/486,649, filed Jul. 14, 2006, entitled "PACKET ROUTING IN A WIRELESS COMMUNICATIONS ENVIRONMENT" (Park, et al.); U.S. patent application Ser. No. 11/486,654 filed Jul. 14, 2006, entitled "PROVISION OF QOS TREATMENT BASED UPON MULTIPLE REQUESTS" (Park, et al.); and U.S. patent application Ser. No. 11/486,655, filed Jul. 14, 2006, entitled "STATE SYNCHRONIZATION BETWEEN ACCESS ROUTERS" (Tsirtsis, et al.). The entireties of each of the aforementioned applications are incorporated herein by reference.

BACKGROUND

I. Field

The invention relates to communication systems and, more particularly, to synchronization between access routers in wireless communication systems.

II. Background

Communication systems frequently include a number of network nodes through which end nodes (e.g., mobile devices) communicate. End nodes communicate with network nodes directly through connections that have been established with the network nodes. Such systems usually rely on the existence of a bidirectional communications link between an end node and an access node to support two-way communications. In such systems, the end node my not know the network layer address of a target destination network node but may be aware of information that it can receive over broadcast channels.

In some systems, end nodes are capable of maintaining multiple bidirectional communications links with different network nodes at substantially the same time. However, such systems typically require the end nodes to send messages intended for a specific network node, with which the end node has a connection, over the link that is directly connected to that specific network node. This approach might not be efficient in some situations especially for wireless link that can fluctuate in terms of quality (e.g., delay and toss characteristics). As a result, the link to the target destination network node may not be the best link available to the end node at the time a message is to be sent to the network node. Typically, this limitation is overcome by resorting to network layer communications that can be routed through multiple hops due to the user of network layer addresses (e.g., IP addresses). This approach of using network layer address may not be efficient especially when the messaging relates to link layer specific functions because network layer messages can be much larger than link layer messages in some systems. In addition, inefficient signaling is not suitable for communications over resource restricted air links.

Network nodes that are serving neighboring geographical cells are typically known to each other through a manual configuration. During such configuration, various parameters are configured in a network node corresponding to several of its neighbors. Such configuration is typically labor intensive and error prone due to human error and the fact that the network layout of a wireless networks often changed relevant to a gradual phased deployment of a wireless communications system.

In addition, the network nodes might not be aware of which of the other network nodes are serving the same end node. Thus, if there is a change in the state of the end node, it is unknown which, if any, of the other network nodes should have the state change information. This information regarding the state of the end node is important to maintain a consistent and reliable user experience.

Therefore, to overcome the aforementioned as well as other deficiencies, there is a need to communicate the state change information efficiently to maintain synchronization between network nodes.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof various aspects are described in connection with updating access routers with wireless terminal state information. An access router can be at least abase station, an access point, a packet data serving node (PDSN), and/or a gateway general packet radio services (GPRS) support node. A wireless terminal state can be at least a terminal identification, a quality of service configuration, authorization parameters, and/or a timer associated with system use.

According to an embodiment is a method for state change synchronization with multi-party handshake. The method includes sending a first message to a first access router. The first message includes a first indicator for the first access router and at least a second indicator for at least a second access router. The method also includes receiving an acknowledgment of the first message from the at least a second access router.

In accordance with another embodiment is an apparatus that facilitates state synchronization of access routers. The apparatus includes a processor that transmits a communication to a first access router. The communication can include a first address for a first access router and at least a second address for at least a second access router address. The apparatus also includes a receiver that receives a completion message from the second access router.

According to a further embodiment is an apparatus for state change synchronization. The apparatus includes a means for conveying a first message to a first access router. The first message includes a first address of the first router address and at least a second address of at least a second access router. The apparatus further includes a means for accepting at least a subset of the first message from the second access router.

According to another embodiment is a computer-readable medium having stored thereon computer-executable instructions for updating a multitude of access routers with state change information. The instructions include communicating a message to a first access router. The message includes astute change of a wireless terminal, an address of the first access router, and at least a second address of at least a second access router. The instructions further include receiving an acknowledgment of the message from the second access router.

Still another embodiment is a processor that executes computer-executable instructions for communicating a state change to a multitude of access routers. The computer-executable instructions include conveying a message to a first access router. The message includes a first address of the first access router, at least a second address of at least a second access router, and a return address for a wireless device. The computer-executable instructions further include acquiring at least a subset of the message from the second access router.

Another embodiment includes a method for updating a multitude of access routers with terminal state information. The method includes receiving at a first access router a message having an address for a second access router and an address for at least a third access router. The method further includes routing at least a subset of the message to one of the second and the third access router.

Still another embodiment is an apparatus that facilitates performance consistency of a wireless user device. The apparatus includes a processor that accepts a message from a wireless device. The message includes an indicator for a first access router, an indicator for a second access router, and an indicator for at least a third access router. A memory that stores information related to a state change of the wireless device is included in the apparatus. Also included is a transmitter that transmits at least a subset of the message and the state change to the second access router.

In accordance with another embodiment is an apparatus for synchronizing access routers with wireless terminal state change information. Included in the apparatus is a means for acquiring a message from a wireless terminal and a means for communicating at least a subset of the message to the second access router. The message can include an address for the first access router, an address for a second access router, an address for at least a third access router, and an address for the wireless terminal.

According to another embodiment is a computer-readable medium having stored thereon computer-executable instructions for state change synchronization between a multitude of access routers utilizing multiparty handshake. The instructions include accepting at a first access router a communication for a wireless terminal and transmitting at least a subset of the communication to a second access router. The communication can include a wireless terminal address, an indicator for the first access router, an indicator for the second access router, and an indicator for at least a third access router.

In accordance with a further embodiment is a processor that executes computer-executable instructions for state change synchronization. The instructions include receiving a message that includes a first address of a first access router, a second address of a second access router, and at least a third address of at least a third access router. The instructions also include conveying at least a subset of the message to the second access router.

According to a further embodiment is a method for uniformly updating a multitude of access routers with wireless terminal state change information. The method includes receiving a first message at a first access router, the message including a first indicator for the first access router and at least a second indicator for at least a second access router and a state of a wireless terminal. The method further includes sending at least a subset of the first message to the second access router.

Still another embodiment is an apparatus that facilitates state information synchronization between access routers. The apparatus includes a processor that receives a communication that includes a state of a wireless device, an address for a first access router, and an address for at least a second access router. Also included in the apparatus is a memory that stores information related to the state of the wireless device and a transmitter that transmits at least a portion of the communication to the second access router.

In accordance with another embodiment is an apparatus that facilitates performance consistency of a wireless device. The apparatus includes a means for accepting at a first access router a message from a second access router and a means for conveying at least a subset of the message to a third access router. The message includes a changed state of a wireless device, an address for the first access router, and an address for at least the third access router.

Still another embodiment is a computer-readable medium having stored thereon computer-executable instructions for state synchronization among access routers. The instructions include acquiring at a first access router a communication. Included in the communication is an identification of the first access router, an identification of at least a second access router, and a state of a wireless device. The instructions also include transmitting at least a subset of the communication to the second access router.

According to another embodiment is a processor that executes computer-executable instructions for synchronizing wireless terminal state changes. The instructions include receiving at a first access router a message that includes a state change for a wireless terminal and transmitting at least a subset of the message to at least a second access router. The message includes an address for the first access router and an address for at least a second access router.

In accordance with another embodiment is a method for updating an access router with wireless terminal state information. The method includes receiving a first message at a first access router. The message includes a first access router indicator and a least a state of a wireless terminal. The method further includes sending an acknowledgment of the first message to the wireless terminal.

Still another embodiment is an apparatus that synchronizes an access router with wireless device state information. The apparatus include a processor that receives a message that includes a wireless device state information. Also included in the apparatus is a memory that stores the wireless device information in a retrievable format. A transmitter that transmits at least a subset of the message to the wireless device as an acknowledgment of successful receipt of the first message is also included in the apparatus.

In accordance with another embodiment is an apparatus that facilitates synchronization of wireless state information at an access router. The apparatus include a means for accepting at a first access router a communication from a second access router. Also included is a means for transmitting an acknowledgment of the communication to the wireless device. The message can include an address of the first access router and a state of a wireless device.

Yet another embodiment is a computer-readable medium having stored thereon computer-executable instructions for providing a uniform wireless terminal user experience. The instructions include receiving a communication that includes a first access router address and a state change for a wireless device. The instructions further include conveying at least a subset of the message to the wireless device.

A further embodiment includes a processor that executes computer-executable instructions for state synchronization of an access router. The instructions include accepting at a first access router a message and outputting to a wireless device at least a subset of the message. The message can include an address of the first access router and a changed state for the wireless device.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
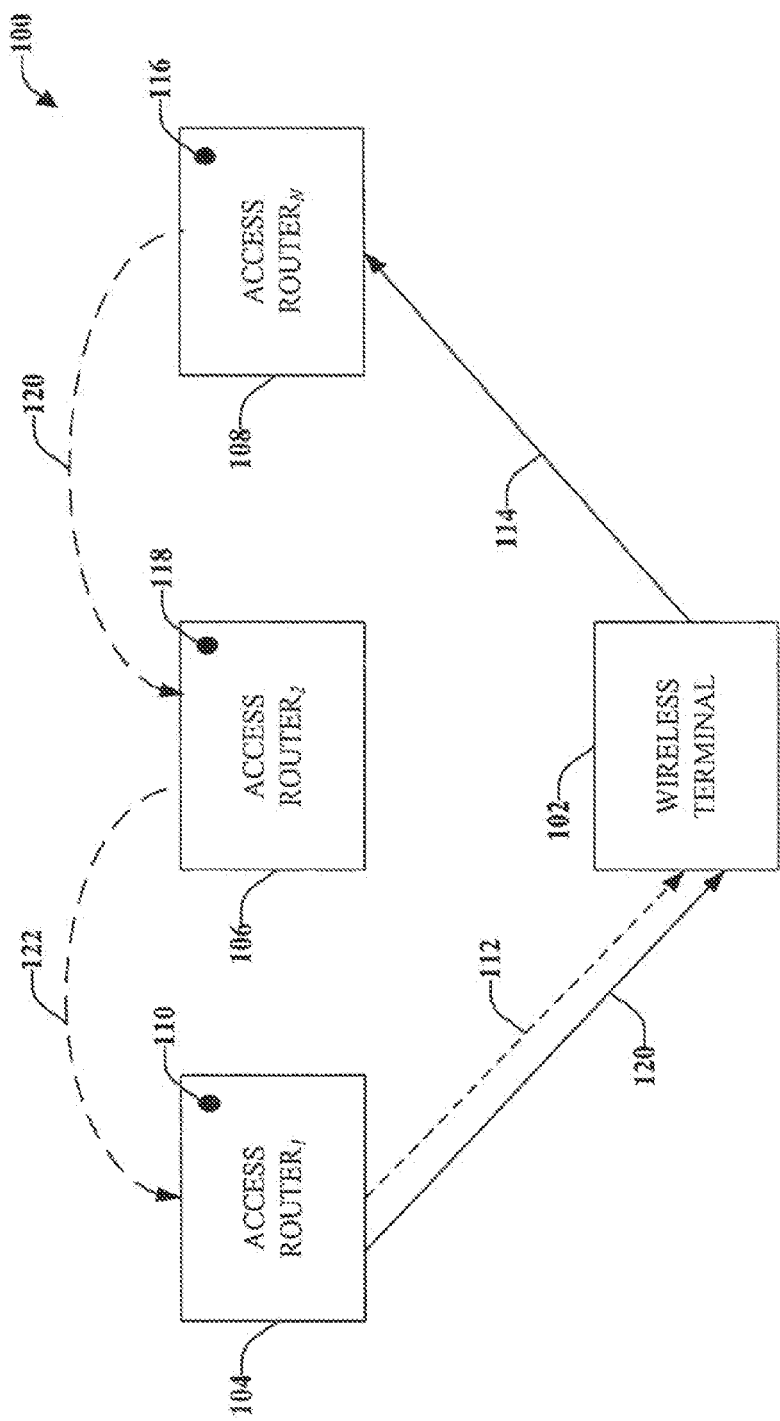
FIG. 1 illustrates a wireless communications system for stay change synchronization with multi-party handshake.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of device, components, modules, and the like. It is to be understood and appreciated that the various systems may include additional devices, components, modules, etc. and/or may not include all of the devices, components, modules etc. discussed in connection with the figures. A combination of these approaches may also be used.

With reference now to the drawings, FIG. 1 illustrates a wireless communications system 100 for state change synchronization with multi-party handshake. A wireless terminal 102 can be capable of communicating with multiple access routers at substantially the same time (e.g., multiple links to direct access routers) without the need for a handoff (e.g., wireless device is stable) between access routers. As illustrated, wireless terminal 102 can communicate with a first access router (Access Router$_1$) 104, a second access router (Access Router$_2$) 106, and at least a third access router (Access Router$_N$) 108, wherein N can be any integer equal to or greater than one. An access router is a device with built-in routing-protocol support and can be a base station, an access point (e.g., IEEE 802.11 access point, IEEE 802.11 (WiMAX) access point, IEEE 802.20 access point), a packet data serving node (PDSN), a gateway general packet radio services (GPRS) support node, FLASH OFDM, or some other terminology. It should be understood that while only one wireless terminal 102 is illustrated, multiple wireless terminals could be in communication with access routers 104, 106, and 108 at substantially the same time.

Generally, wireless terminal 102 is in an active state of operation (including a hold state of operation) with one or more of the access router 104, 106, or 108 at any given time. The link with each access router 104, 106, or 108 is independent. During the active state of operation communication with the access router, a state of wireless terminal 102 might change. For example, when a voice call is set up though an access router, there is a communication through the access router and a new piece of state (e.g., changes in the quality of service configuration to accommodate the voice call) is created. To maintain that voice call, each access router with which the wireless terminal communicates though should have information regarding the new piece of state. Therefore, the state should be replicated in the other access routers, such as through a dynamic synchronization.

Either or both wireless terminal 102 and access router 104, 106, 108 may be aware of the change in the state of the wireless terminal and can notify each other of such a state change. Such a change may occur based on the type of communication to be transmitted (e.g., voice, imagery, text, and the like), on the amount of system 100 traffic, or some other condition that affects the communication link between wireless terminal 102 and access routers 104, 106, and 108. The state of wireless terminal 102 might also change due to an external event (e.g., a server changing a time), even when wireless terminal 102 is in a hold or sleep state. Examples of a state of wireless terminal 102 include but are not limited to a terminal identification, security parameters (e.g., keys), a quality of service (QoS) configuration, authorization parameters, timers associated with system use, a condition of a link, etc. The terminal identification provides information as to which wireless terminal 102 the communication applies. Security parameters provide information as to what keys are used for one of authentication, encryption, and derivation of other keys between the access router and the wireless terminal. QoS configuration for wireless terminal 102 allows traffic to be handled in higher or lower priority, more or less probability of delay, and more or less probability of loss. The authorization parameters can include information regarding actions a user of a particular wireless device can or cannot perform. The timers associated with system 100 use my indicate the expiration of a time after which wireless terminal 102 is no longer authorized to use the system, or vice versa. There is a multitude of other states that access router(s) 104, 106, and 108 may hold for a wireless terminal 102, and which should be synchronized among access routers 104, 106, 108 to provide a consistent user experience.

Other exemplary states include, but are not limited to the following: HaAddress, HoAddress, MIPLifetime, HomeNAI, TempNAI, LocationUpdateInterval, PagingCycle, MSK, MSKLife. HaAddress is an IP Address of the HA used by the subscriber. HoAddress is an IP Address assigned to the subscriber. MIPLifetime is the Lifetime of the HoAddress. HomeNAI is the Home Network Access Identifier and is the permanent and globally unique identifier of the subscriber. TempNAI is a Temporary Network Access Identifier and is a locally unique identifier assigned to the subscriber. LocationUpdateInterval is the maximum interval in which the terminal must send location update messages when it is in a sleep state. PagingCycle is the frequency in which the terminal must check the paging channel for pages. MSK is a Master Session Key, which is a Key derived from the authentication phase during access. It is utilized to derive airlink keys for encryption/authentication. MSKLife is the Lifetime of the MSK.

At substantially the same time as the state of wireless terminal 102 changes, a new piece of the state (shown as dot 110) is created in access router 104 aware of the state change. It should be understood that white the following discussion relates to access router 104 being the base station that is aware of the state change, any access router can be aware of the change and the following applies equally to any access router 104, 106, and 108. Access router 104 can send an optional message 112 to wireless terminal 102 indicating a state change. In accordance with some embodiments, wireless terminal 102 may be aware of the state change and does not need a message from access router 104. In some embodiments, access router 104 may not be aware of the state change, thus, there is no message sent to wireless terminal 102, however, wireless terminal 102 should notify access router 104 of the state change and the change 110 is created in access router 104.

Wireless terminal 102 can forward a message 114 to any access router 104, 106, or 108 indicating that there is a state change. If wireless terminal 102 sends the message to access router 104 aware of the state change, the message does not have to provide the state change information. If, however, wireless terminal 102 sends a notification of a state change in message to a different access router 106 or 108, as illustrated, the message should contain the state change information in order for the other access routers in communication with wireless terminal 102 to have a new piece of the state (illustrated as dots 116 and 118).

Message 114 sent by wireless terminal 102 can include a listing of access routers 104, 106, 108 to which wireless terminal 102 can communicate without a handoff occurring.

The link between wireless terminal 102 and the access routers to which message 114 is not sent does not have to be an active state of operation (e.g., hold, sleep). In accordance with some embodiments, message 114 includes an address of wireless terminal 102. Message 114 can include an indicator of the access router(s), which can be a network address or IP address, a physical layer address, a connection identification (CID), a lower layer address or link layer address, a Logical Link Control (LLC) identification, or another means of identifying or distinguishing the access routers.

Access router 108 at substantially the same time as receiving message 114, identifies itself as one of the access routers included in message 114. If state information is included in the message, and access router 108 is not aware of the state information, access router 108 can store the information 116 in a storage medium. The information should be retained in a readily accessible manner to allow for identification and retrieval of the state information when a subsequent communication is received from (or intended for) wireless terminal 102. Access router 108 can mark its address as having received the message or simply remove its address or identifier from the message in accordance with some embodiments prior to routing the remaining portion of the message to another access router. Marking the address, rather than removing the address allows other access routers to know which access routers in the list have already received and synchronized the state information. In accordance with some embodiments, the message is sent to access router 104 that notified wireless terminal 102 of the state change, and therefore, message (sent to access router 104) does not include the state information. In such embodiments, access router 104 can append the state information to the message (prior to forwarding to another access router identified in message.

The next access router 106 stores the state change information 118 in a retrievable format. An identification of access router 106 can be marked as synchronized or removed from the message and the subset of the message forwarded 122 to the next access router 104. Each access router performs a similar function until the last access router in the list receives the information. This last access router, after recording the state change information, forwards the message or an acknowledgment (ACK) 120 to wireless terminal 102. ACK 120 can be message 114, a subset of message 114, or another communication notifying wireless device 102 that the access routers identified in message 114 have been updated with the state information. In such a manner, information is exchanged between access routers 104, 106, and 108, and an acknowledgment 120 sent to wireless terminal 102 without the need for wireless terminal 102 to communicate individually with each access router 104, 106, and 108.

Figure 2:
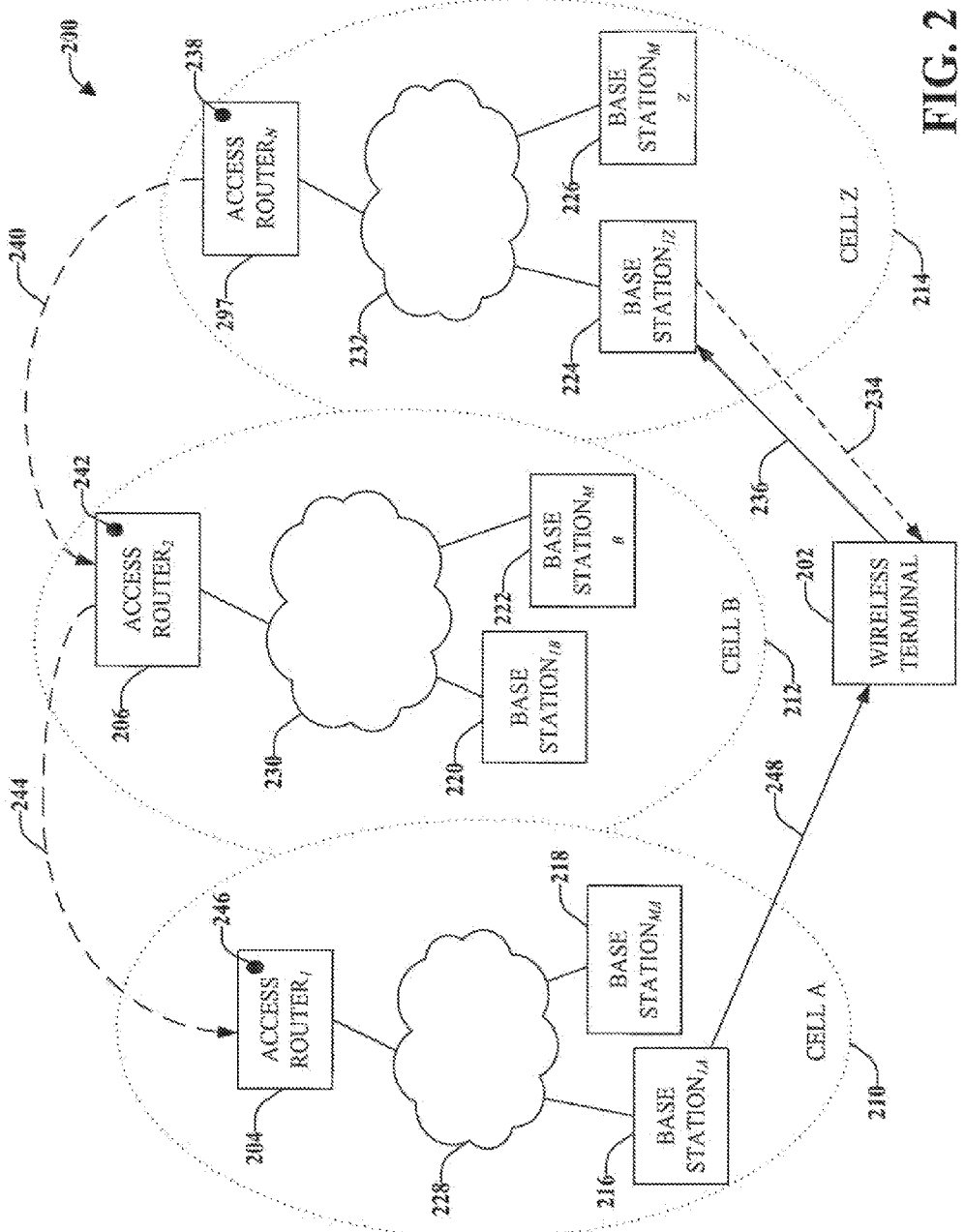
FIG. 2 illustrates an embodiment of a wireless communications system for state change synchronization with multi-party handshake at the system core.

FIG. 2 illustrates an embodiment of a wireless communication system 200 for state change synchronization with multi-party handshake at the system core. It should be understood that while the various embodiments shown and described herein refer to a state change, the disclosed techniques can work equally well in other situations. An example of such a situation includes when a wireless device is new to a communications system and, thus, access router(s) need to be synchronized to communicate with wireless device. Another situation occurs when a new access router entering the communications system and should be synchronized with the wireless terminal state information.

A wireless terminal 202 can communicate with a first access router (Access Router$_1$) 204, a second access router (Access Router$_2$) 206, and at least a third access router (Access Router$_N$) 208, wherein N can be any integer equal to or greater than one. Each access router 204, 206, 208 can operate in a respective geographic area or cell, depicted as dotted lines and labeled "Cell A" 210, "Cell B" 212, and "Cell Z" 214, wherein Z is an integer greater than or equal to one. Each cell 210, 212, 214 can have one or more base stations. For example, Cell A 210 includes Base Station$_{1A}$ 216 and Base Station$_{MA}$ 218, Cell B 212 includes Base Station$_{1B}$ 220 and Base Station$_{MB}$ 222, and Cell Z 204 includes Base Station$_{1Z}$ 224 and Base Station$_{MZ}$ 226, wherein M is an integer greater than or equal to zero. Each base station 216-226 communicates with a respective access router 204, 206, or 208, through a network 228, 230, 232.

The access routers 204, 206, 208 contain the terminal state information and no state information is maintained at the base station 216-226 level. Since wireless terminal 202 can communicate with devices in any cell 210, 212, and 214, synchronization of terminal state information should be synchronized among access routers 204, 206, 208 to maintain a consistent user experience. The transfer of terminal state information is similar to that shown and described with reference to the above figure.

Wireless terminal 202 at substantially the same time as receiving notification of a state change (either from an access router (shown as optional communication 234, or based on its own knowledge), notifies 236 an access router 208 of the state change and includes an indicator for the access routers to which the wireless terminal 202 is connected. Although the communication to access router 208 is illustrated as traversing through base station 224, the communication can be through either base station 224 or 226. Access router 208, maintains the state change 238 in a retrievable format. In accordance with some embodiments, access router 208 can mark or otherwise identify its address as being synchronized with the information or remove its own address from the message, and forward the remaining subset of the message 240 to the next access router 206 identified in message 236. The terminal state 242 is recorded in access router 206 and a message 244 forwards to the next identified access router 204. Message 244 can be a subset of message 240 or 236 with the address of access router 206 marked or removed. This process continues until the state change information is received at the last access router 204 identified in message 236. The last access router 204 records the state change 246 and forwards an ACK 248 to wireless terminal 202, which can be the last address included in the message 236. It should be understood that while communication with wireless terminal 202 has been illustrated as flowing through a particular base station, the communication can be transferred through any base station.

Figure 3:
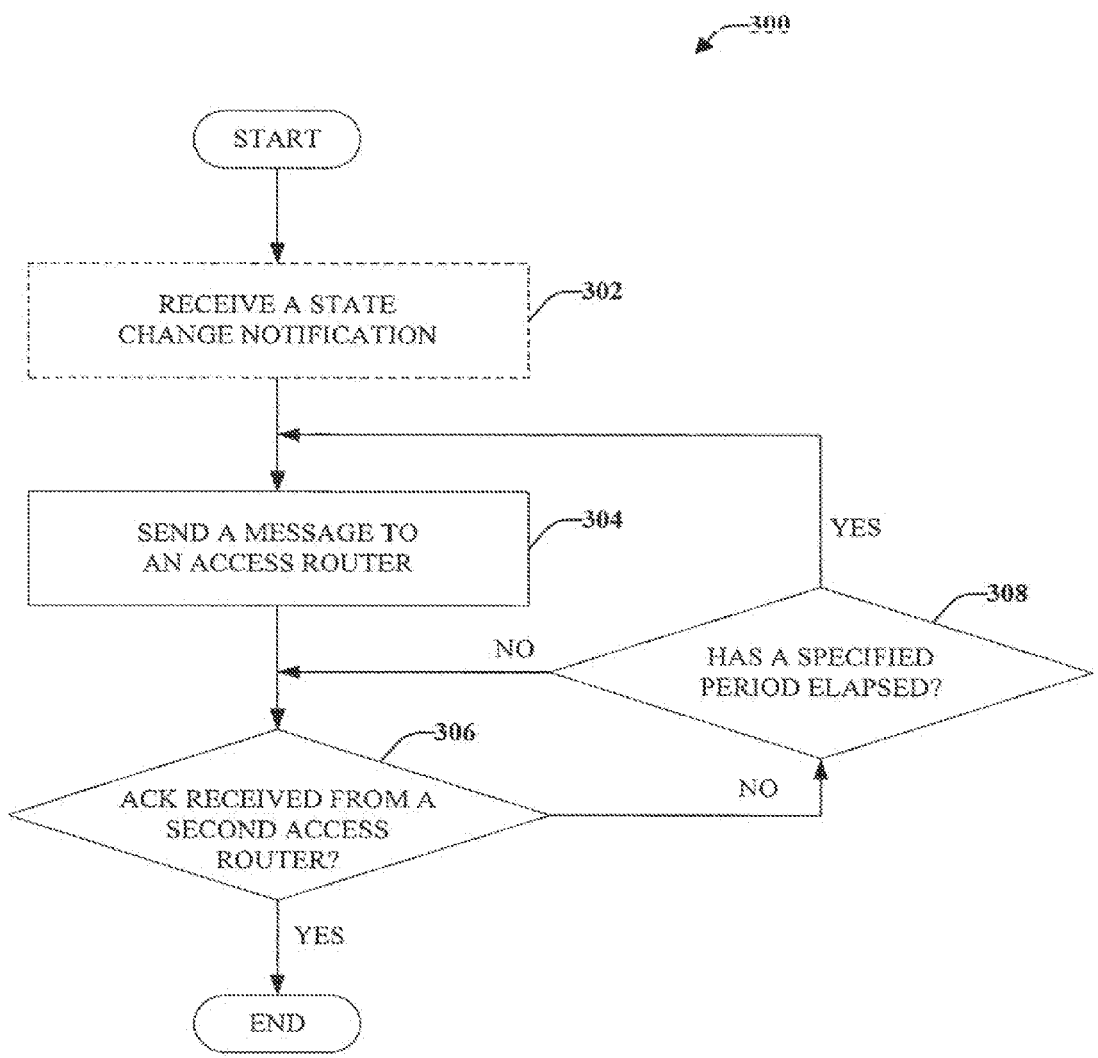
FIG. 3 illustrates a methodology for communicating access router information for synchronization of state information.

FIG. 3 illustrates a methodology 300 for communicating access router information for synchronization of state information. While, for purposes of simplicity of explanation, the methodologies are shown and described as a series of blocks, it is to be understood that the disclosed embodiments are not limited by the number or order of blocks, as some blocks may occur in different orders and/or concurrently with other blocks than what is depicted and described herein. Moreover, not all illustrated blocks may be required to implement the described methodologies. A methodology could alternatively be represented as a series of interrelated states or events, such as in a state diagram. It is to be appreciated that the functionality associated with the blocks may be implemented by software, hardware, a combination thereof or any other suitable means device, system, process, component). Additionally, it should be appreciated that the methodologies disclosed throughout this specification are capable of being stored on an article of manufacture to facilitate transporting and transferring such methodologies to various devices.

Methodology 300 begins at 302 where a state change notification is received at, for example, a wireless terminal. The state change can relate to how the network performs with respect to the wireless terminal, a condition of a link, a quality of service configuration, an authorization parameter, a terminal identification, timers associated with system use, or other information. The state change notification can be received from an access router that has an active link with the wireless terminal. In some embodiments, the wireless terminal can receive the state change notification from a processor or other device internal to the wireless terminal that detects or processes the state change. Thus, receiving the notification from a source external to the wireless device is optional.

At 304, a message is sent to an access router. The message can be sent over an Internet protocol, in an application that is currently running, or though other communication means. The message can include a listing of at least two access routers to which wireless terminal is linked and to which wireless terminal can communicate without the need for a handoff. The listing of access routers can include a specific route that the message should take through the access routers (e.g., source-based routing). In some embodiment, the listing includes the access routers but not routing information (e.g., the routing among access routers can take any path). The listing of access routers can include an indicator, such as an address or other means of identifying the access routers. If the message is sent to an access router that sent a notification, at 302, the message may not include the state change information. However, if the notification received, at 302, was not from an access router, or if the message, sent at 304, is to a different access router than the one that sent a notification, at 302, the message should include the state change information. It is to be understood that the wireless terminal may not necessarily understand or process the state change, but should know that there is a state change in order to convey the appropriate message at 304. Included in the message can be a resource reservation protocol. In some embodiments, the message can include an encryption key and/or timers associated with an encryption key.

A determination is made, at 306, whether an acknowledgment (ACK) has been received from an access router different from the access router to which the message was sent, at 304, such as the list access router in the message. If an ACK has been received ("YES"), it indicates that the relevant access routers have been updated with the state change information. If an ACK has not been received ("NO") a determination is made, at 308, whether a predetermined period has elapsed. The period can be measured utilizing any means (e.g., time, algorithm). If the period has not elapsed ("NO"), the method continues, at 306, for a determination whether an ACK has been received. The ACK may be an actual acknowledgment of the message or it may be a subset of the message sent, at 304. If the period has elapsed ("YES") (e.g., timer has timed out), it indicates that there has been a communication failure and the method continues at 304, where another message is sent to an access router. The message may include a routing different from the original routing, if a routing was provided. In some embodiments, the message may include a request for an ACK from each access router, rather than one ACK from the last access router that receives the message. An ACK, from each access router would provide an indication of which access router has experienced a communication failure. The communication failure can be the result of a multitude of conditions including an incorrect address, a failure at one or more access router, or another condition. It should be understood the method can proceed from 308 to 304 or 306 any number of times, until an ACK is received.

Figure 4:
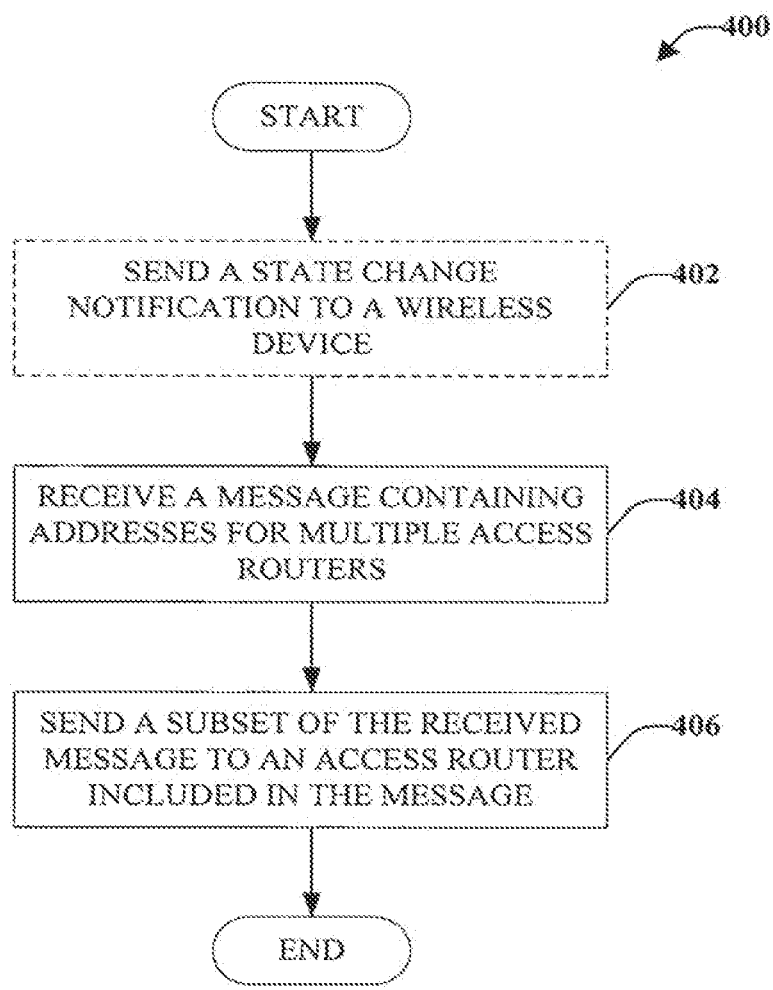
FIG. 4 illustrates a methodology for receiving a state change notification and conveying at least a subset of the state change information.

FIG. 4 illustrates a methodology 400 for receiving a state change notification and conveying at least a subset of the state change information. At 402, an optional notification of a state change is sent to a wireless device. The notification can be sent if the wireless device is not aware that there has been a state change (e.g., no message has been received from the wireless device). It should be understood that in accordance with some embodiments, there is no notification sent at 402 and the method begins at 404, where a message is received from the wireless device. This can occur if the wireless device is aware of the state change.

The message received, at 404, can include information regarding the state change. In accordance with some embodiments, the information regarding the state change can be added to the message, such as by an access router that sent the initial notification, at 402. Thus, in some embodiments, the wireless terminal is not aware of the state that changed, only that there was a change. The message received, at 404, should include an indicator for at least two more access routers. The indicator can be, for example an IP address, a CID or physical layer address, a LLC identifier or link layer address, a network address, or the like.

The state change information in the received message is stored in the access router receiving the message. The indicator for the access router can be marked as having received and synchronized with the information or the indicator for the access router can be removed from the message and, at 406, the marked or remaining portion of the message can be routed to one of the other access routers. The marked or remaining portion of the message should include the identifier for the other access routers and the state change information. In accordance with some embodiments, an ACK is sent to the wireless terminal at substantially the same time as the message is forwarded to one of the other access routers identified in the message.

Figure 5:
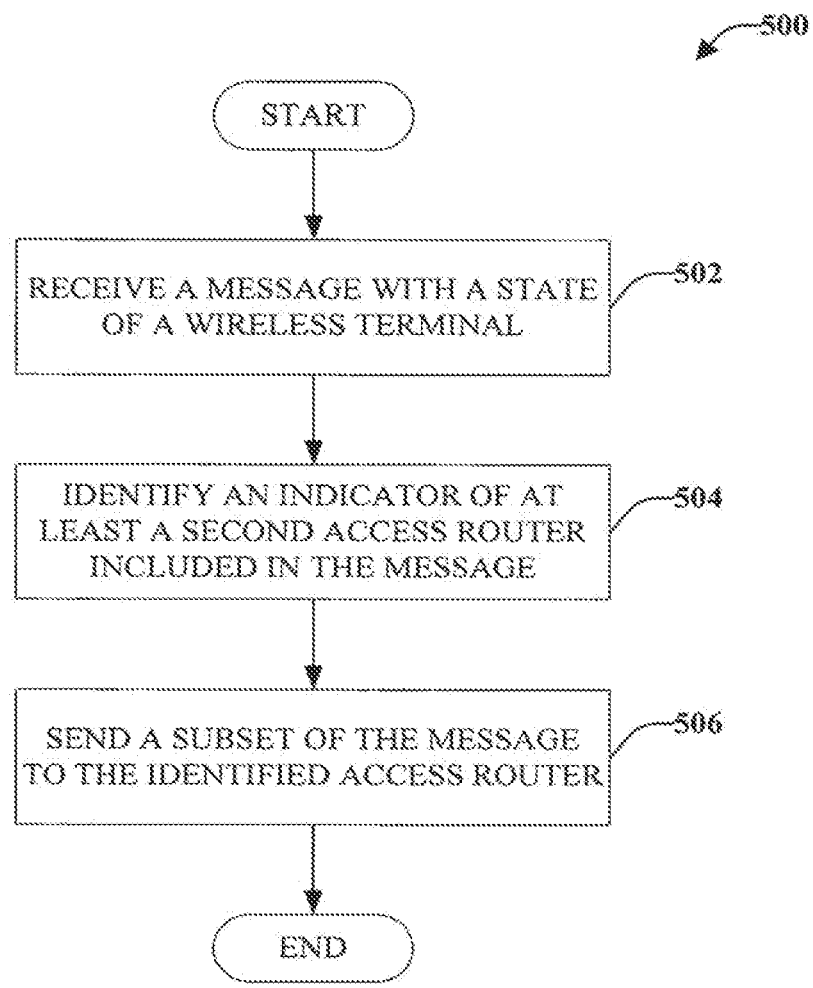
FIG. 5 illustrates a methodology for routing terminal state information for synchronization between access routers.

FIG. 5 illustrates a methodology 500 for routing terminal state information for synchronization between access routers. At 502, a message that includes a state of a wireless terminal is received. This message can be received from an access router that directly received a message from the wireless terminal. In some embodiments, the message is received from an access router that received the information from another access router, rather than directly from the wireless terminal. The message can include an indicator for the access router that received the message, at 502, and at least one other access router to which the information should be communicated. The state of the wireless terminal can be stored in a storage medium or memory and should be in a readily retrievable format.

At 504, an access router is identified through the indicator included in the message and can be any access router included in the message or it can be the next access router included in the message (e.g., designated routing of the message). The indicator of the access router can be marked as synchronized with the message information or removed from the message prior to the message being sent to the identified next access router. In such a manner, the next access router receives the state change information as well as the remaining access routers that should receive the state change information and, in some embodiments, can receive information regarding access routers that have already been updated with the information. Thus, the message sent, at 506, includes only a portion or subset of the originally received message. In some embodiments, the next access router contains a message that includes the access routers that have already received the information.

Figure 6:
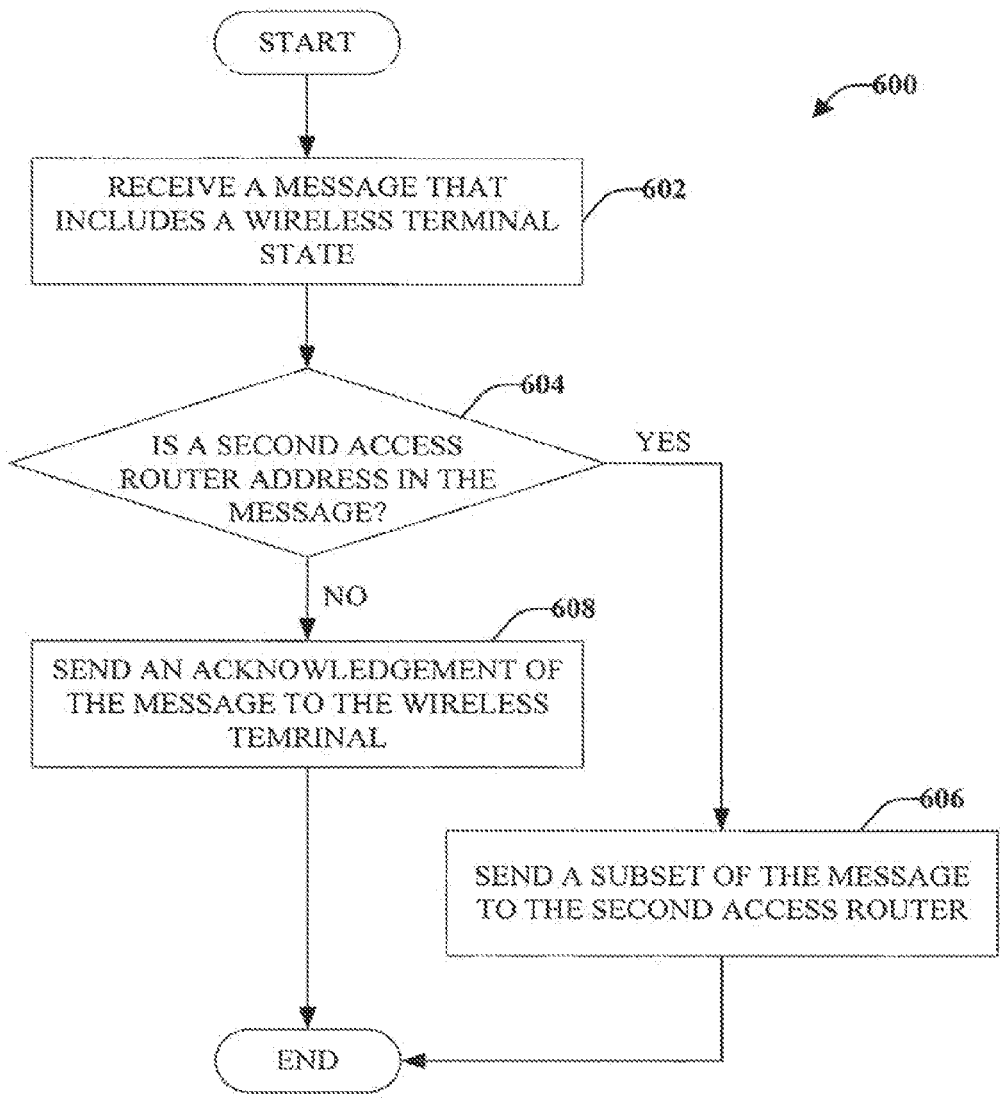
FIG. 6 illustrates a methodology for synchronizing a terminal state and providing an acknowledgment upon successful receipt of the state information.

FIG. 6 illustrates a methodology 600 for synchronizing a terminal state and providing an acknowledgment upon successful receipt of the state information. The method 600 starts, at 602, when a message is received at an access router from another access router. The message can include an indicator of the access router receiving the message and a state of a wireless terminal. The state of the wireless terminal is retained by the access router and, at 604, a determination is made whether there is at least another access router indicator (e.g., address) included in the message.

If there is another access router indicator in the message ("YES"), it indicates that other access routers still need to be synchronized with the wireless terminal state information. The message is forwarded to the next access router, at 606, wherein the indicator of the current access router can be marked as having been synchronized or simply removed prior to forwarding the message. If there is no other access router indicated in the message ("NO"), an acknowledgment (ACK) is sent to the wireless terminal, at 608. In accordance with some embodiments, the ACK is the state of the wireless terminal. For example, the message can include indicators for the access routers and an indicator for the wireless terminal. The routing of the message would traverse the access routers and then be routed to the wireless terminal. The wireless terminal, upon receiving the state information confirms that this state information was already sent to its access routers, and thus, infers that there is state synchronization between its access routers. Thus, the ACK does not necessarily have to indicate that the message has been successfully received by each access router.

Figure 7:
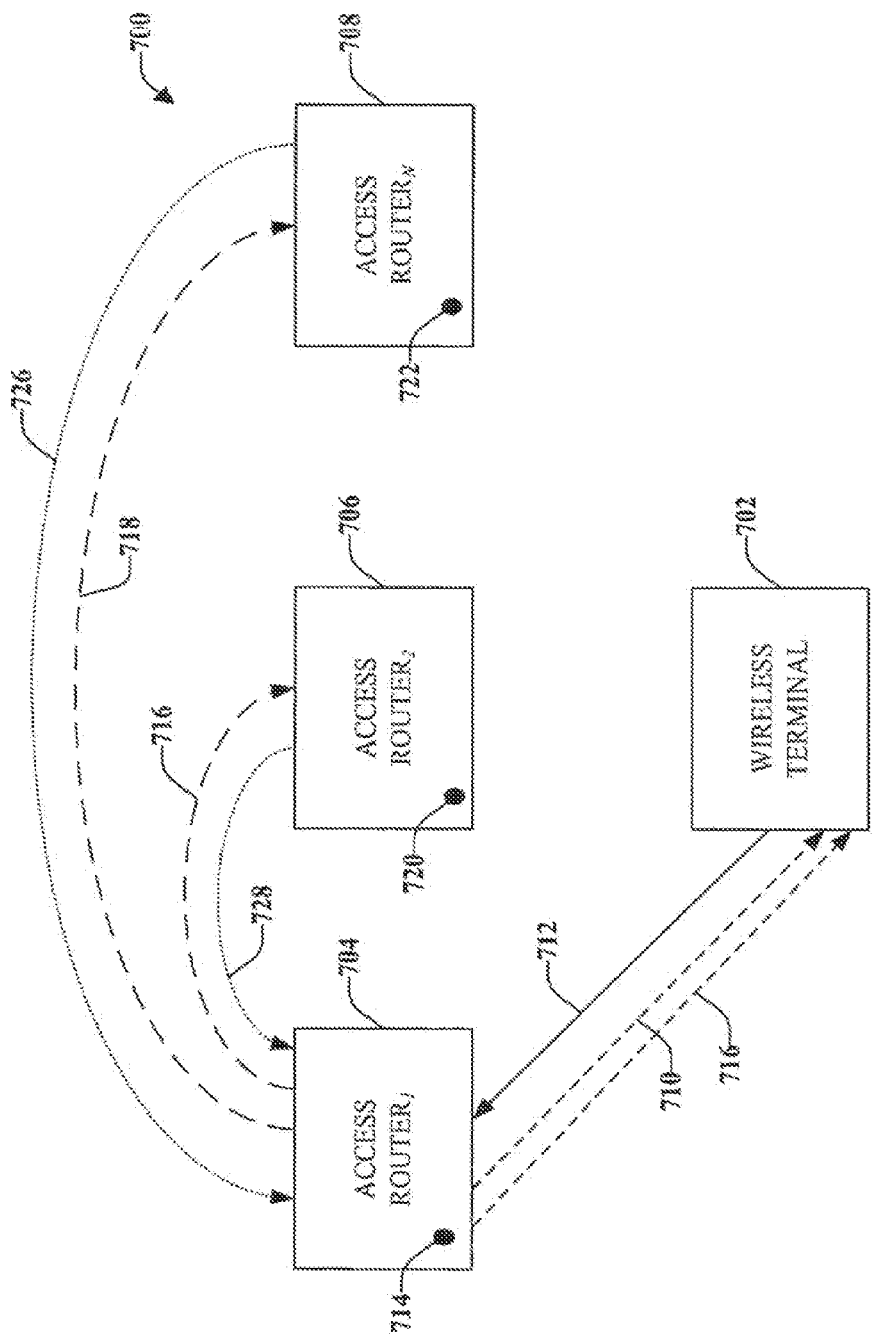
FIG. 7 illustrates a wireless communications system for synchronization of state information between multiple access routers.

FIG. 7 illustrates a wireless communications system 700 for synchronization of state information between multiple access routers. System 700 includes a wireless terminal 702 capable of communicating with multiple access routers at substantially the same time without the need for a handoff between access routers. As illustrated, wireless terminal 702 can communicate with a first access router (Access Router$_1$) 704, a second access router (Access Router$_2$) 706, and at least a third access router (Access Router$_N$) 708, wherein N is an integer equal to or greater than one.

If an access router 704, 706, or 708 detects a state change of wireless terminal 702, the access router can send a notification to wireless terminal 702, at 710. However, in some embodiments, wireless terminal 702 is aware of the state change and does not need notification 710 from access router 704. It should be understood that while access router 704 is illustrated as notifying wireless terminal 702 and/or receiving a message from wireless terminal 702, such notification and/or receipt can be performed by the other access routers 706 and/or 708.

Wireless terminal 702 can send a message, at 712, to access router 704. The message can include the changed state information and a listing of other access routers to which wireless terminal 702 communicates. If the message does not include the state change information, the message 712 should be sent to the access router 704 aware of the change (e.g., the access router that notified wireless terminal that there was a state change). Wireless terminal 702 does not need to know what state changed, only that there was a state change. In some embodiments, the message can include an encryption key and/or timers associated with an encryption key. Included in the message can be a resource reservation protocol.

At substantially the same time as receiving the message 712, access router 704 retains information 714 regarding the state. Access router also identifies the access routers that should receive the state information and sends an individual communication 716 and 718 to each identified access router 706 and 708. Information 720 and 722 regarding the state is retained by each access router 706 and 708. For example, access router 704 can receive a message from wireless terminal 702 indicating a state change and a listing of three access routers (704, 706, and 708). If access router 704 received the message from wireless terminal, access router 704 identities access routers 706 and 708 as those access routers that should receive the state information. Thus, access router 704 would send a message that includes the state change information to access router 706 and a second message that includes the state change information to access router 708. The message sent to routers 706 and 708 does not have to include specific access router information.

In some embodiments, access router 704 receives a confirmation or acknowledgment 724, 726 from access router 706 and access router 708. Access router 704 can utilize acknowledgments 724, 726 to define when to send an acknowledgment (ACK) 716 to wireless terminal 702 after all access routers receive and synchronize the terminal state information. If an ACK is not received at wireless terminal 702 before expiration of a pre-determined interval, a subsequent message may be sent to the same or different access router 704. The expiration of the pre-determined interval indicates a communication failure at one or more access router, and therefore, the access routers may not have been synchronized with the terminal state information. However, in accordance with other embodiments, an ACK 716 is not sent to wireless terminal 702.

Figure 8:
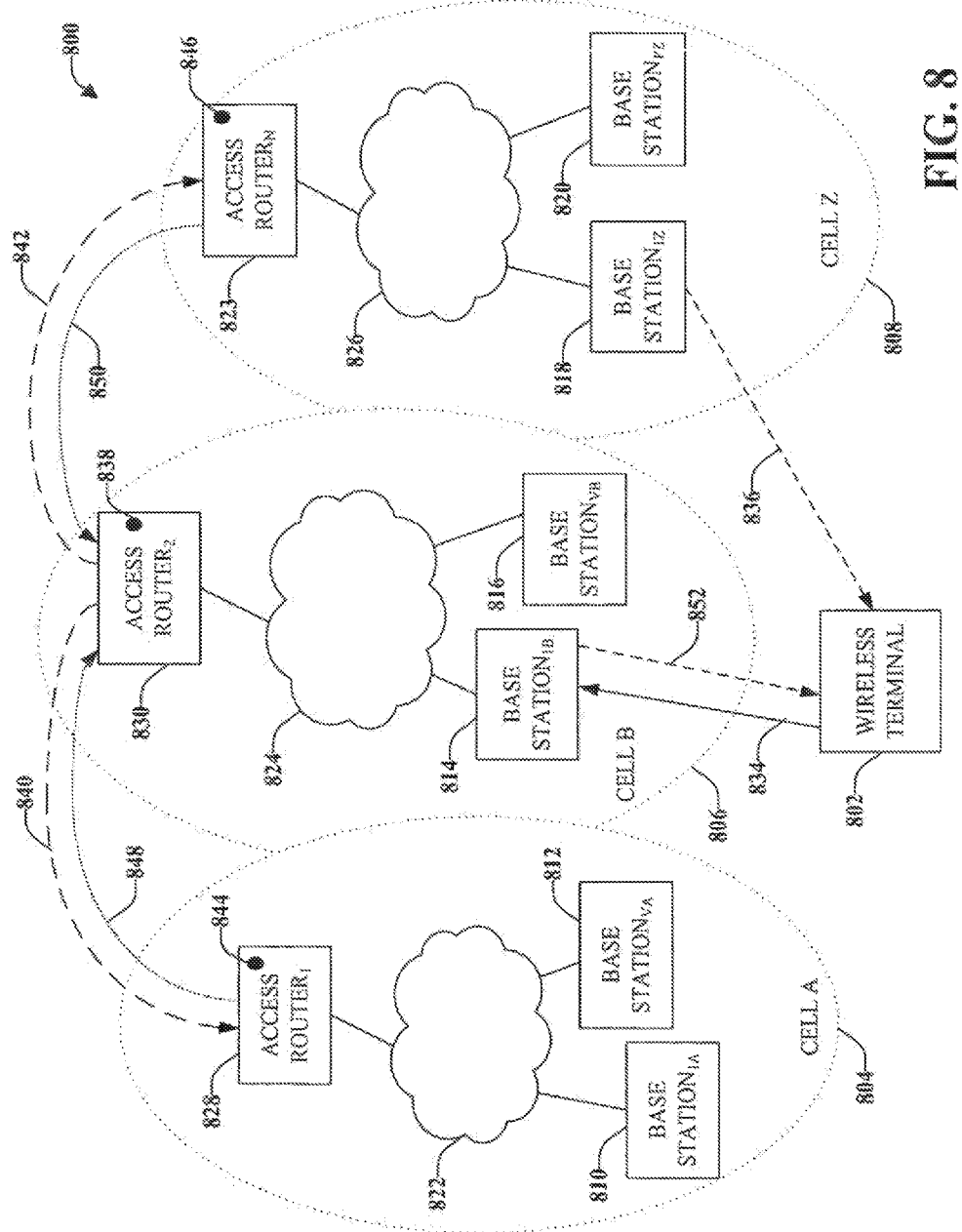
FIG. 8 illustrates an embodiment of a wireless communications system for synchronization of state information between multiple access routers at the system core.

FIG. 8 illustrates another embodiment of a wireless communications system 800 for synchronization of state information between multiple access routers at the system core. System 800 includes a wireless terminal 802 that can communicate within one or more geographic cells, labeled Cell A 804, Cell B 806, and Cell Z 808. Each cell 804, 806, 808 can have one or more base stations. For example, Cell A 804 includes Base Station$_{1A}$ 810 and Base Station$_{VA}$ 12, Cell B 806 includes Base Station$_{1B}$ 814 and Base Station$_{VB}$ 816, and Cell Z 808 includes Base Station$_{1Z}$ 818 and Base Station$_{VZ}$ 820, wherein V is an integer greater than or equal to zero.

The base stations 810-820 communicate through respective wireless networks 822, 824, and 826 to respective access routers 828, 830, and 832 that are located at the system 800 core. In order to provide a consistent user experience, each access router 828, 830, and 832 should include a replicate of a state of the wireless terminal (e.g., synchronized with respect to the state). When a state changes, wireless terminal 802 may be aware of the change and automatically send a message 834 an access router, such as access router 830 through one of its base stations, such as base station 814. It should be understood that the message can be sent to any access router 828, 830, or 832 through one of its respective base stations 810-820.

In some embodiments, wireless terminal 802 is not aware of the state change and, therefore, receives a notification 836 that a state has changed from an access router through a base station, illustrated as base station 818. If wireless terminal 802 sends message 834 to an access router (through its respective base station) that sent notification 836, message 834 does not need to include the state change. If however, as illustrated, message 834 is sent to access router that did not send notification 836, the message 834 should include the state change information. Message 834 should contain a listing of access routers to which wireless terminal 802 can be in communication without handoff (e.g., access routers 828, 830, and 832).

Message 834 is relayed to access router 830 and the state change 838 is retained by access router 830 in a retrievable format. Access router 830 can identify those access routers 828 and 832 that should receive the state change information, base on the information contained in message 834 and can forward at least a portion of the message 834 containing the state change information to these identified access routers 828 and 832, as illustrated at 840 and 842. At substantially the same time as receiving the messages 840 and 842, each access router 828 and 832 stores a portion of the state change information 844 and 846.

In some embodiments, each access router 828 and 832 sends an acknowledgment 848, 850 to access terminal 830 upon successful receipt of the state change information sent in messages 840 and 842. Access router 830 can send an acknowledgment 852 to wireless terminal 802 through base station 814 (or a different base station) upon receipt of the acknowledgment 848, 850 from each access router 828 and 832 or at substantially the same time as sending each access router 828 and 832 a portion of the message. In accordance with some embodiments, wireless terminal 802 does not receive an acknowledgment 852.

Figure 9:
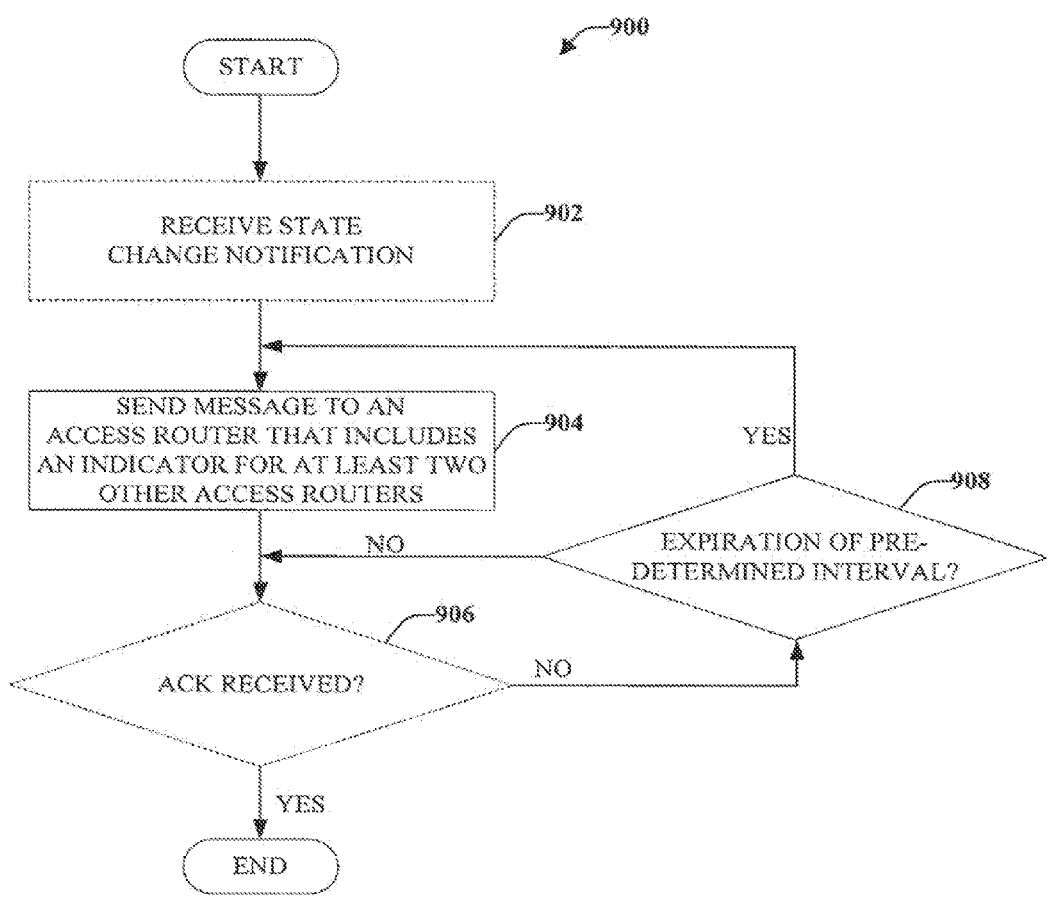
FIG. 9 illustrates a methodology for communicating state information for synchronization of access routers.

With reference now to FIG. 9, illustrated is a methodology 900 for communicating state information for synchronization of access routers. The method 900 starts at 902 where a notification is received indicating a state change. This notification can be received from an access router having an active link with a wireless terminal. In accordance with some embodiments, the wireless terminal is aware of a state change a notification is not sent from an access router. In such embodiments, method 900 starts, at 904, where a message is sent to an access router, the message includes an indicator for at least two other access routers that communicate with wireless terminal. If wireless terminal received a notification of the state change and the message is sent to the access router that notified wireless terminal, the message does not need to include the state change. If, however, the wireless terminal did not receive a notification or if the message is sent to an access router different from the access router that sent the notification, the message should include information regarding the state that changed.

The method 900 continues, at 906, where a determination is made whether an acknowledgment is received. If the acknowledgment is received ("YES"), the method ends. If an acknowledgment is not received ("NO"), a determination is made, at 908, whether a pre-determined interval has expired. Such a pre-determined interval can take into account the amount of time needed to communicate with the various access routers to which wireless terminal has a link. The pre-determined interval can take into account the number of access routers as well as the number of wireless terminals serviced by such access routers. The pre-determined interval can also consider various other parameters including a communication speed, historical information regarding the response time for an acknowledgment, as well as other factors. It should be understood that in accordance with some embodiments, an acknowledgment is not received, thus, the method does not track an expiration of a pre-determined interval.

If the pre-determined interval has not expired ("NO"), the method continues at 906 with a determination whether an acknowledgment is received. If the pre-determined interval has expired ("YES") a subsequent message can be sent to the same or a different access router, at 904. Expiration of the pre-defined interval can indicate a communication failure or other failure in the network, including defective access routers, overloaded access routers, access routers removed from the network, or other network scenarios. It should be understood that returning to 904 and/or 906 can be continuous, such that any number of waiting periods can be entered or subsequent messages can be sent until an acknowledgment is received, in accordance with those embodiments that utilize an acknowledgment.

Figure 10:
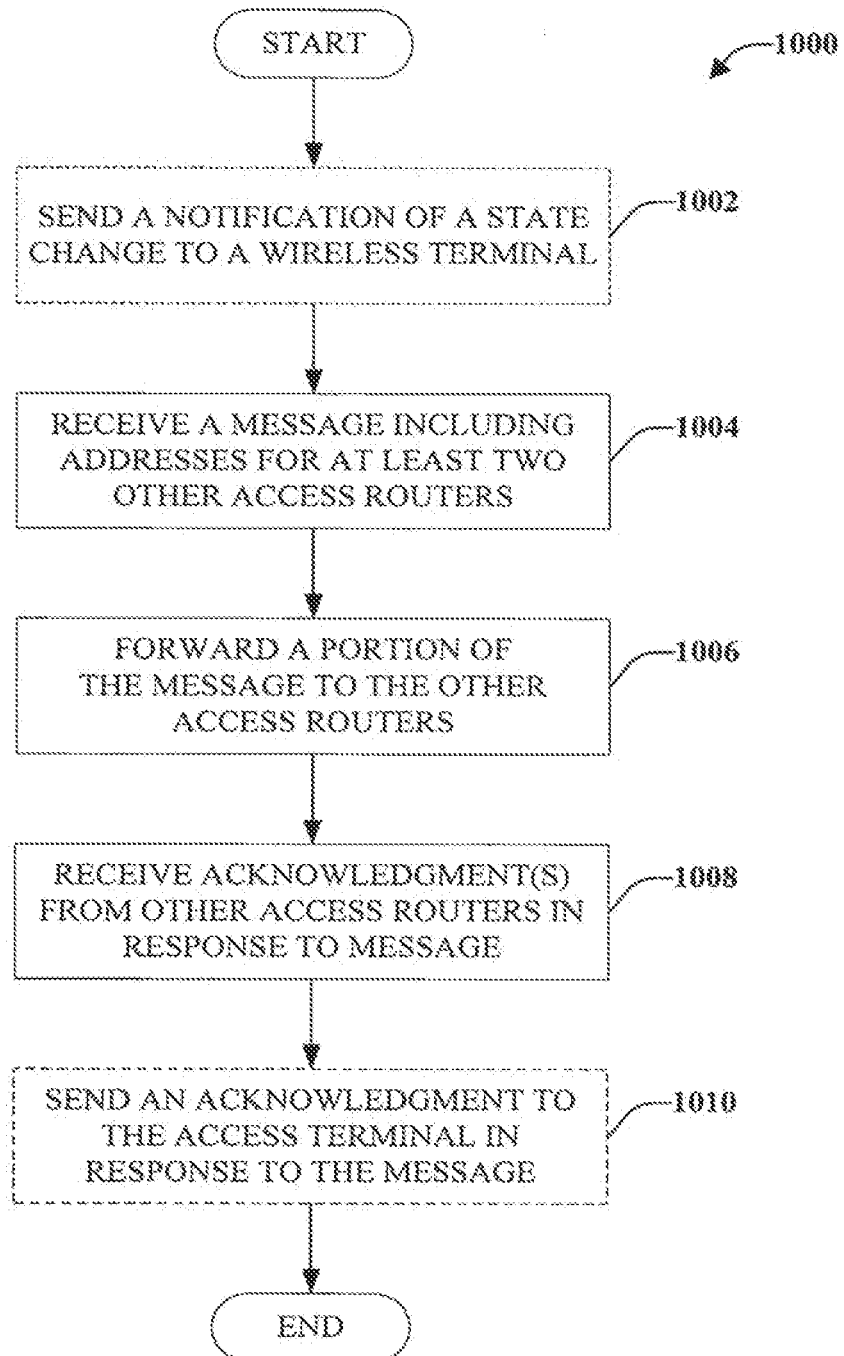
FIG. 10 illustrates a methodology for state synchronization of multiple access routers with minimal communication from a wireless terminal.

Turning now to FIG. 10, illustrated is a methodology 1000 for state synchronization of multiple access routers with minimal communication from a wireless terminal. At 1002, an optional notification of a state change is sent to a wireless terminal. Such a notification can include information regarding the state change or a generic state change notification (e.g., a notification that a state changed but not the specifics of the state change). For those embodiments in which a state change notification is not sent to a wireless terminal, the method 1000 begins at 1004, where a message is received from a wireless terminal.

The message received at 1004 should include an address for at least two other access routers with which wireless terminal has a communication link. The message received can also include the state change information if the access router receiving the message did not send the wireless terminal a state change notification. The access router that received the message identifies the other terminals that should receive the state information for synchronization in order to provide the user of the wireless device with a consistent user experience. At least a portion of the message that includes the state change information is sent to the other access routers identified in the received message, at 1006. The same message or individual messages can be sent to the other access routers.

At 1008, an acknowledgment is received from the other access routers in response to the message sent, at 1006. Upon receipt of the acknowledgment(s), the method 1000 continues, at 1010, with an optional acknowledgment sent to wireless terminal. Such an acknowledgment can notify wireless terminal that the access routers are synchronized with respect to the wireless terminal state. In some embodiments, an acknowledgment is not sent to the wireless terminal.

Figure 11:
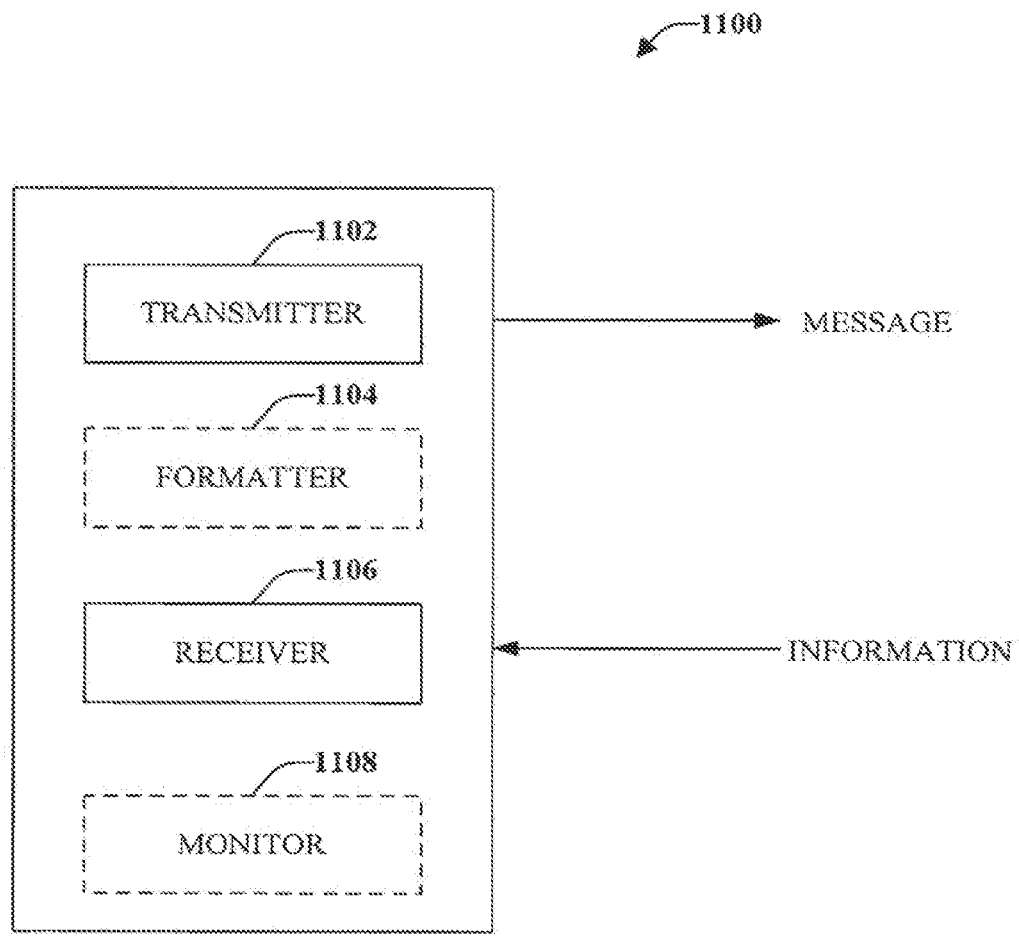
FIG. 11 illustrates a wireless device that communicates with an access router in accordance with the various embodiments.

FIG. 11 illustrates a wireless device 1100 that communicates with an access router in accordance with the various embodiments. Wireless device 1100 includes a transmitter 1102 that can be configured to send a message to various devices including an access router. For example, the information conveyed can include a listing of access routers that wireless device 1100 communicates or it can be a multi-hop message that indicates a particular routing that the sent information could traverse. An optional formatter 1104 can be configured to include state change information in the message or an address of the wireless device 1100, or other information that should be retained by an access router.

Wireless device 1000 also includes a receiver 1106 that can be configured to acquire various messages or subsets of messages, such as a return message. Receiver 1106, in accordance with some embodiments, can receive an acknowledgment that indicates state synchronization among access routers that were indicated in a message sent by transmitter 1102. Receiver 1106 can also be configured to acquire a state change notification from an access router or other network device.

An optional monitor 1108 can be included in wireless device 1100 that can track a predetermined interval that begins when a message is sent to an access router and ends when an acknowledgment is received in response to the message. If the acknowledgment is not received before expiration of the predetermined interval, a communication failure can be inferred. A subsequent message can be sent if a communication failure results.

Figure 12:
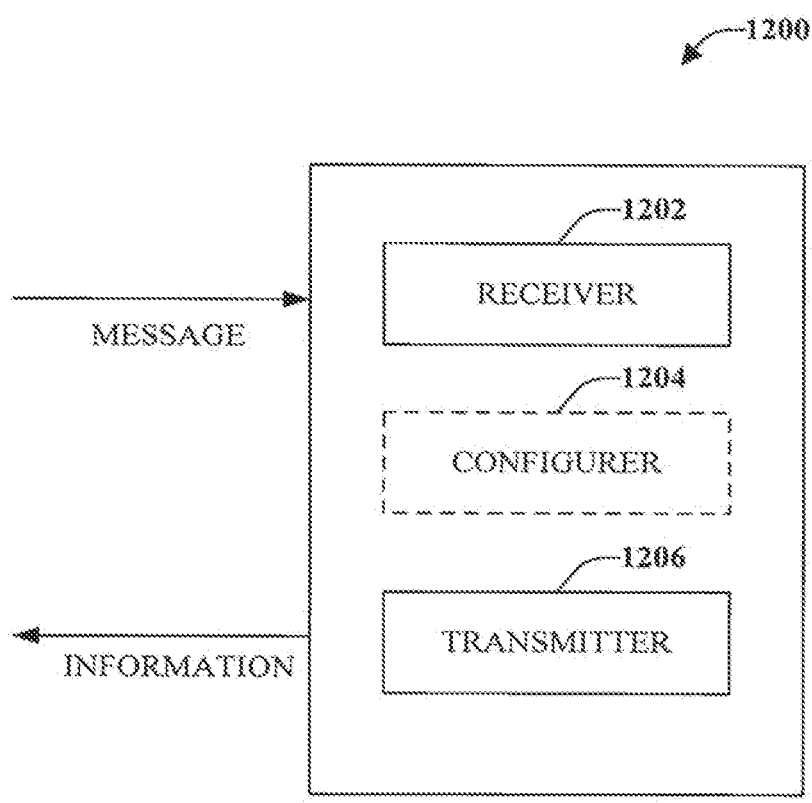
FIG. 12 illustrates an access router that facilitates state synchronization.

FIG. 12 illustrates an access router 1200 that facilitates state synchronization. Access router 1200 can include a receiver 1202, a configurer 1204, and a transmitter 1206 that can convey information to various devices (e.g., wireless terminals, access routers). Receiver 1202 can be configured to receive from a wireless device a message that includes access router information. The message from the wireless device can also include state change information, an acknowledgment request, or other information. Receiver 1202 can also be configured to accept information from other access routers, wherein such information can be state information, a reply to a previously sent message and/or an acknowledgment.

Configurer 1204 can modify a message received from a wireless device and/or an access router. For example, if the message does not include state information, configurer may append the message with the information. Thus, when the message is sent to one or more other access routers, through transmitter 1206, the other access routers can automatically be updated with the state information. Configurer 1204 can also update or remove various information from the message prior to the message being transmitted to an access router and/or wireless device. Configurer 1204 can further reformat a message depending on the intended recipient.

Figure 13:
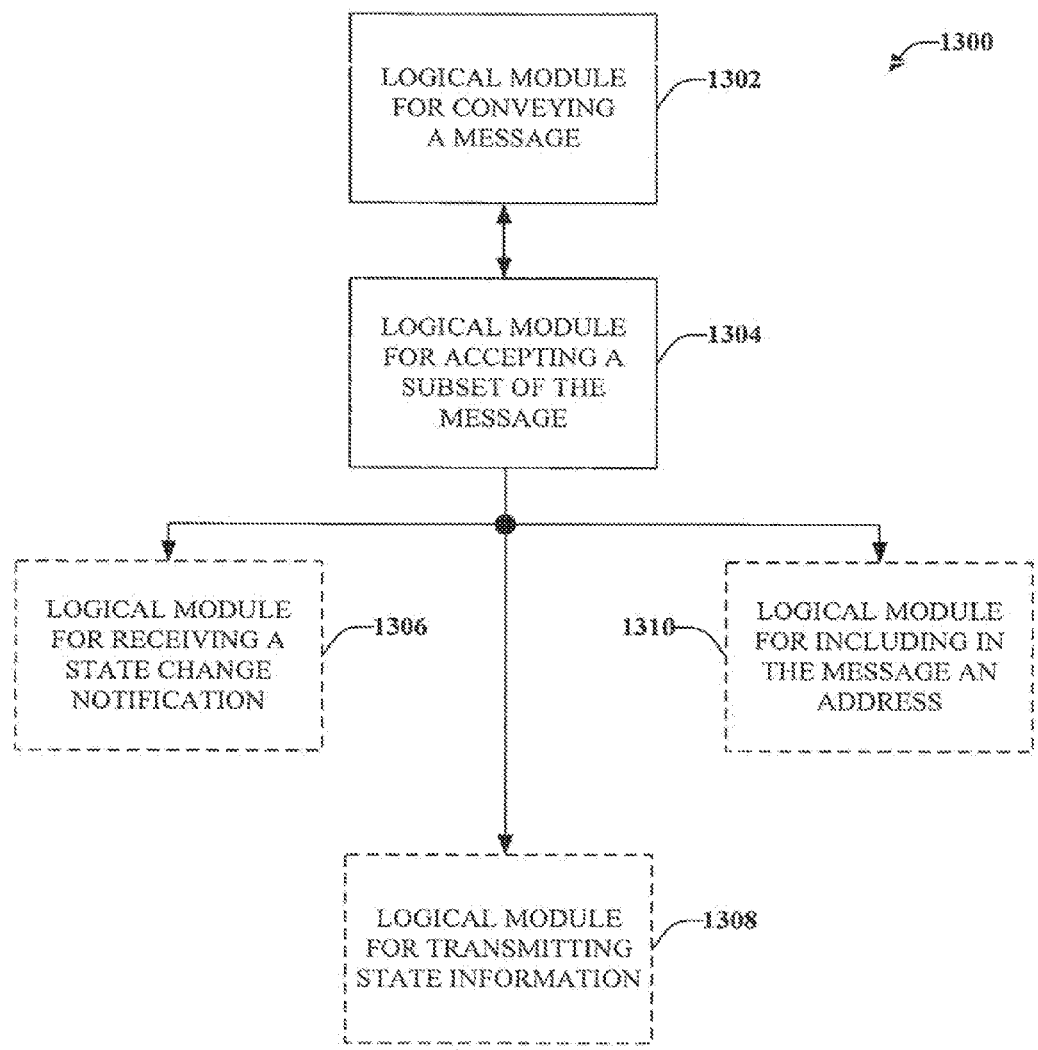
FIG. 13 illustrates a block diagram of an apparatus for state change synchronization.

FIG. 13 illustrates a block diagram of an apparatus 1300 for state change synchronization. Apparatus 1300 is represented as functional blocks, which can be functional blocks that represent functions implemented by a processor, software or combination thereof (e.g., firmware).

Apparatus 1300 includes a logical module 1302 for conveying a message to a first access router. The message can include an address of the first access router and an address for at least a second access router. Also included is a logical module 1304 for accepting at least a subset of the message from the second access router. The subset of the message can be an acknowledgment.

In some embodiments, apparatus 1300 can include a logical module 1306 for receiving a state change notification. Such a notification can be a state change of a wireless terminal. In some embodiments, apparatus 1300 includes a logical module 1308 for transmitting a state of the wireless terminal with the first message sent by logical module 1302. Apparatus 1300 can include, in some embodiments, a logical module 1310 for including in the first message an address for the apparatus 1300.

Figure 14:
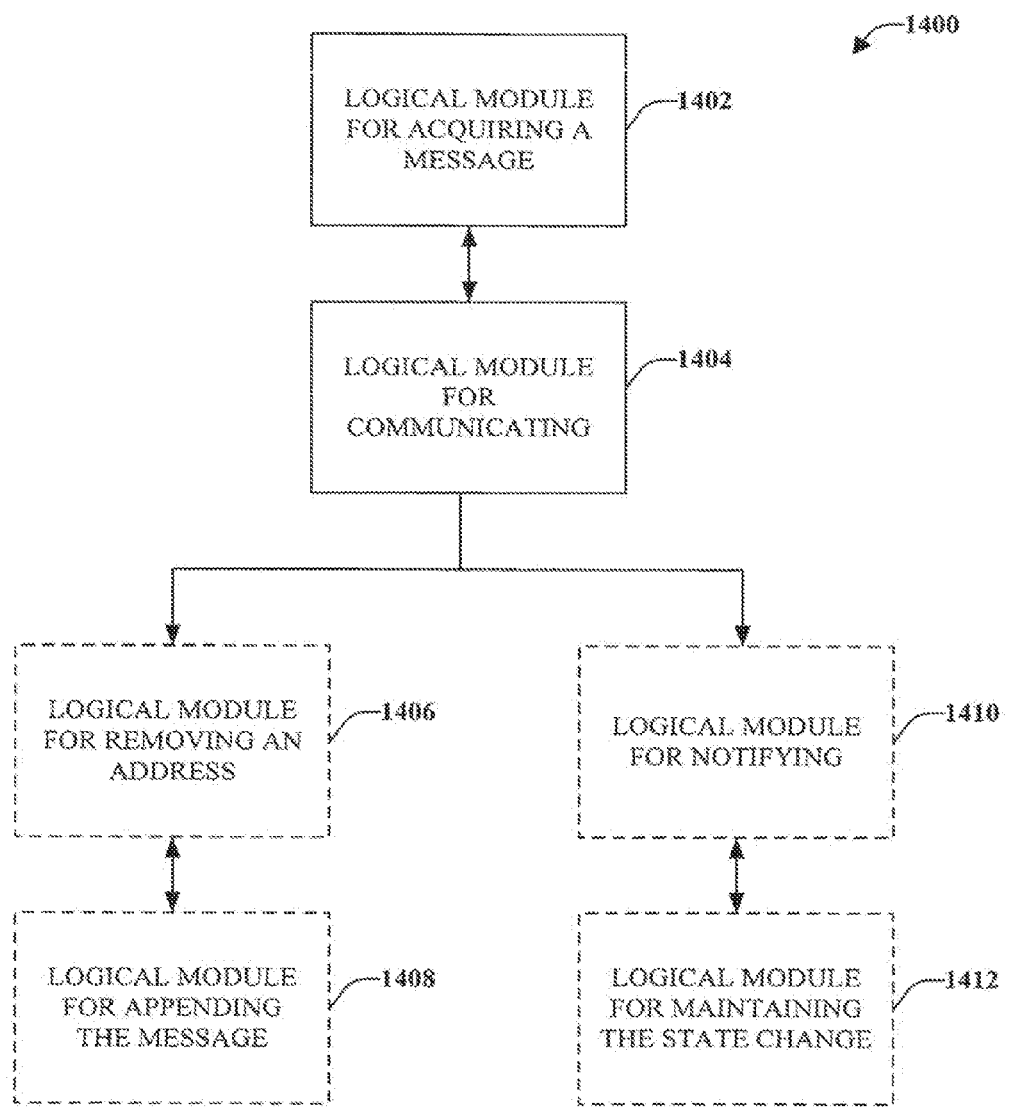
FIG. 14 illustrates a block diagram of an apparatus for synchronizing access routers with wireless terminal state change information.

FIG. 14 illustrates a block diagram of an apparatus 1400 for synchronizing access routers with wireless terminal state change information. It should be noted that apparatus 1400 is represented as functional blocks, which can be functional blocks that represent functions implemented by a processor, software or combination thereof (e.g., firmware).

Included in apparatus 1400 is a logical module 1402 for acquiring a message from a wireless terminal. The message can include an address for a first access router, an address for a second access router, and an address for at least a third access router. Also included in the message can be a destination address for the wireless terminal. A logical module 1404 for communicating at least a subset of the message to the second access router is included in apparatus 1400.

In some embodiments, apparatus 1400 can include a logical module 1406 for removing the address for the first access router from the message and a logical module 1408 for appending a state change of the wireless terminal to the message. In accordance with some embodiments, apparatus 1400 includes a logical module 1410 for notifying the wireless terminal of a state change (e.g., a terminal identification, a quality of service configuration, an authorization parameter, a timer associated with system use, a condition of a link) and a logical module 1412 for maintaining the state change for a subsequent communication with the wireless terminal.

Figure 15:
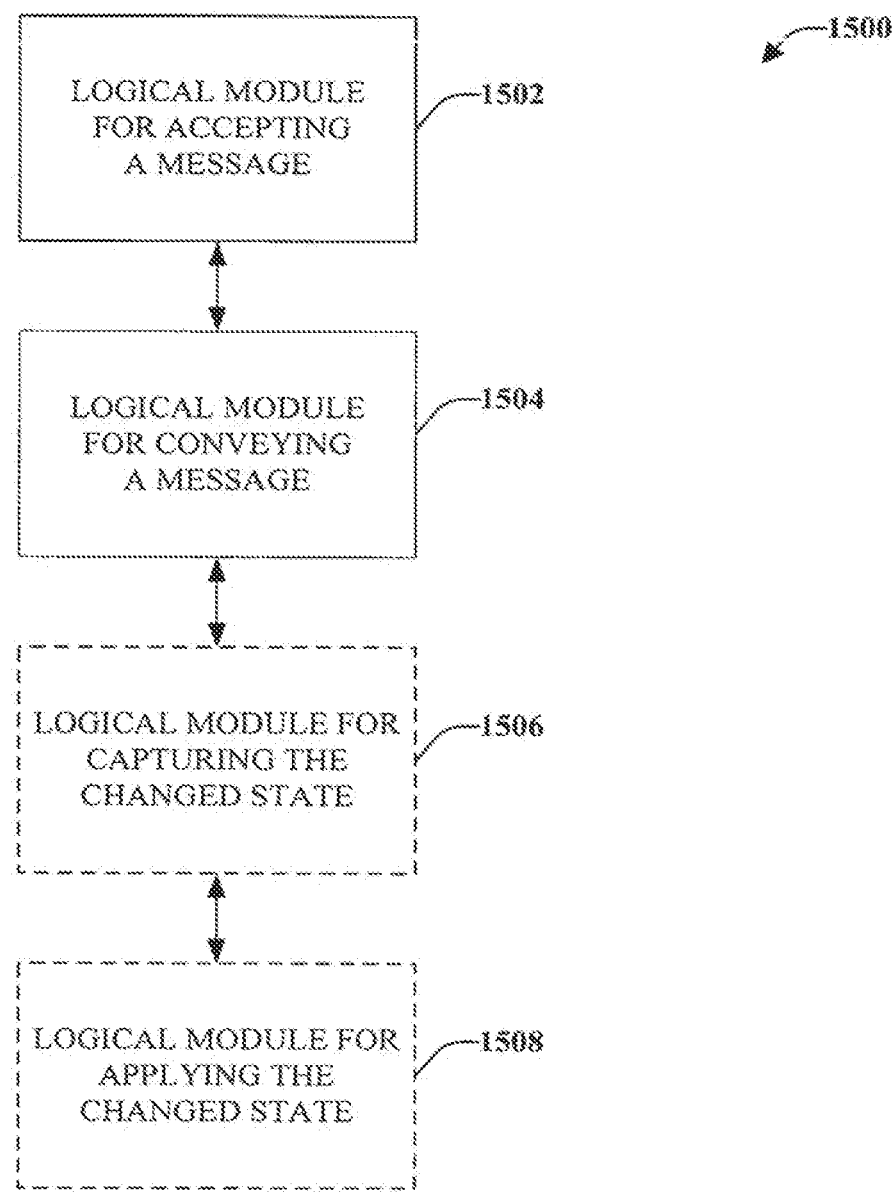
FIG. 15 illustrates a block diagram of an apparatus that facilitates performance consistency of a wireless device.

FIG. 15 illustrates a block diagram of an apparatus 1500 that facilitates performance consistency of a wireless device. Apparatus 1500 is represented as functional blocks, which can be functional blocks that represent functions implemented by a processor, software or combination thereof (e.g., firmware).

Apparatus 1500 can include various logical modules to facilitate performance consistency. A logical module 1502 for accepting at a first access router a message from a second access router is included. The message can include a changed state of a wireless device, an address for the first access router, and an address for at least a third access router. In some embodiments, the message can include an identifier or address of the wireless device. Apparatus 1500 can also include a logical module 1504 for conveying at least a subset of the message to the third access router.

In some embodiments, apparatus 1500 can include a logical module 1506 for capturing or storing the changed state of the wireless device. Also included can be a logical module 1508 for applying the changed state to a subsequent communication with the wireless device.

Figure 16:
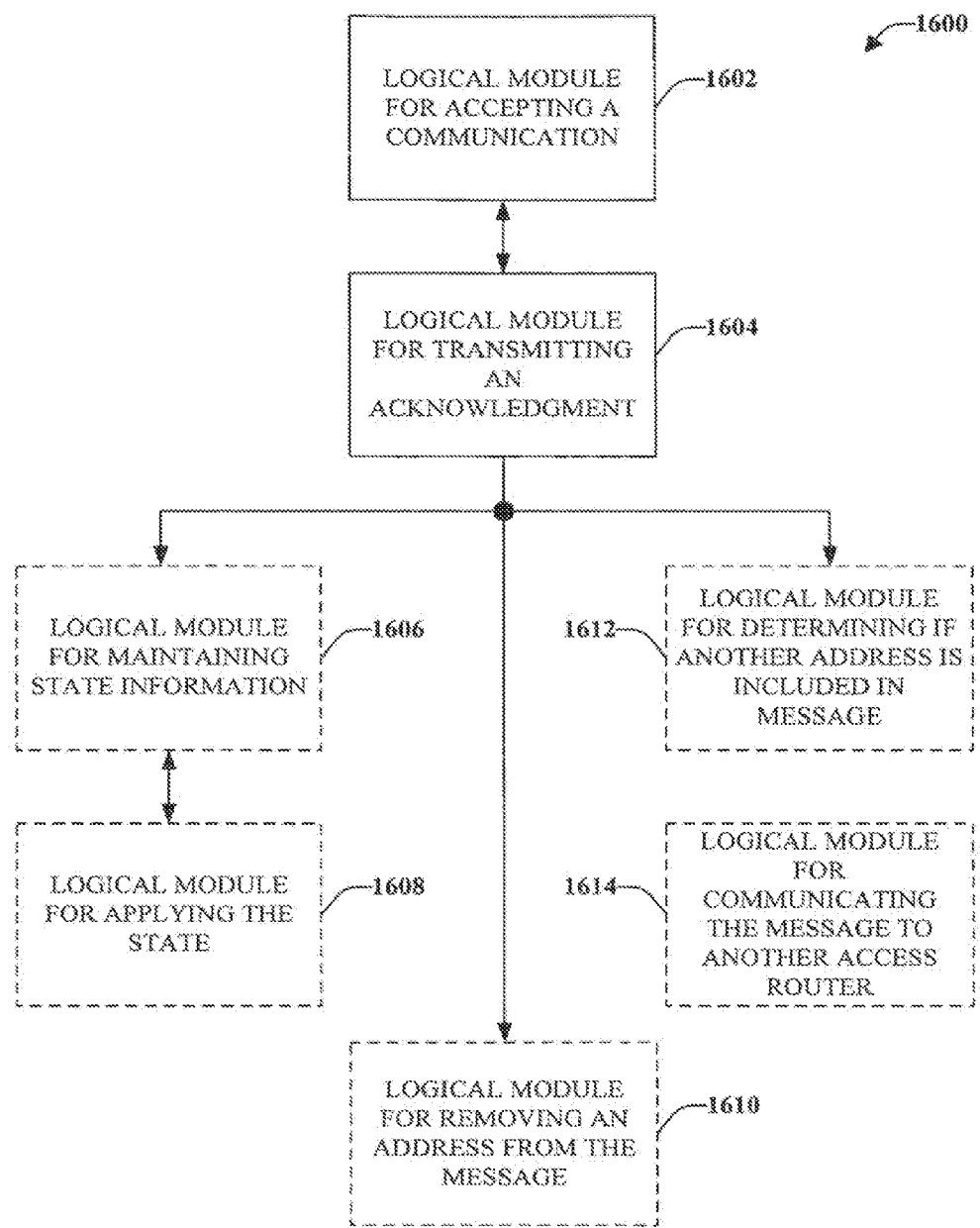
FIG. 16 illustrates a block diagram of an apparatus that facilitates synchronization of wireless state information at an access router.

FIG. 16 illustrates a block diagram of an apparatus 1600 that facilitates synchronization of wireless state information at an access router. Apparatus 1600 is represented as functional blocks, which can be functional blocks that represent functions implemented by a processor, software or combination thereof (e.g., firmware).

Apparatus 1600 can include a logical module 1602 for accepting at a first access router a communication from a second access router. The message can include an address of the first access router and a state of the wireless device. Also included can be a logical module 1604 for transmitting an acknowledgment of the communication to the wireless device.

In some embodiments, apparatus 1600 can include a logical module 1606 for maintaining the state of the wireless terminal at the first access router and a logical module 1608 for applying the state of the wireless device during a subsequent communication with the wireless device. In some embodiments, apparatus 1600 includes a logical module 1610 for removing the address of the first access router from the message prior to transmitting the acknowledgment to the wireless device.

Apparatus 1600 includes, in accordance with some embodiments, a logical module 1612 for determining if the message includes a second address for a third access router. Also included can be a logical module 1614 for communicating at least a subset of the message to the third access router.

Figure 17:
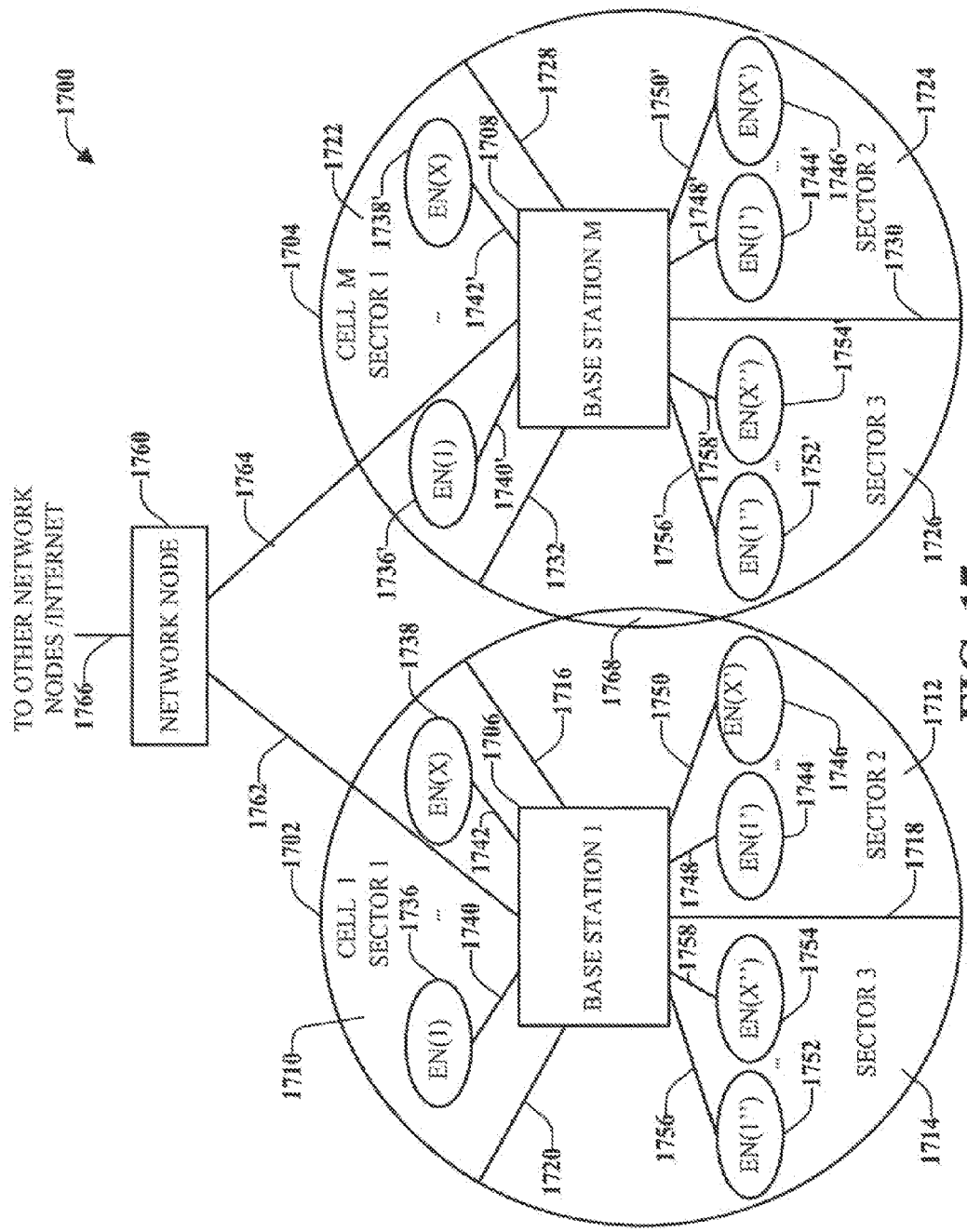
FIG. 17 illustrates a network diagram of an exemplary communications system implemented in accordance with the various embodiments.

FIG. 17 illustrates an exemplary communications system 1700 implemented in accordance with the various embodiments. Communications system 1700 includes multiple cells, labeled Cell 1 1702 and Cell M 1704, wherein M is an integer greater to or equal to one. Neighboring cells 1702, 1704 can overlap slightly, as indicated by cell boundary region 1768, thereby providing the potential for signal interference between signals being transmitted by base stations in neighboring cells. Each cell 1702, 1704 of exemplary system 1700 includes three sectors. Cells which have not been subdivided into multiple sectors (N=1), cells with two sectors (N=2) and cells with more than three sectors (N>3) are also possible in communications system 1700. Cell 1 1702 includes a first sector, sector 1 1710, a second sector, sector 2 1712, and a third sector, sector 3 1714. Each sector 1710, 1712, 1714 has two sector boundary regions; each boundary region is shared between two adjacent sectors. Sector boundary regions provide the potential for signal interference between signals being transmitted by base stations in neighboring sectors.

Line 1716 represents a sector boundary region between sector 1 1710 and sector 2 1712; line 1718 represents a sector boundary region between sector 2 1712 and sector 3 1714; line 1720 represents a sector boundary region between sector 3 1714 and sector 1 1710. Similarly, cell M 1704 includes a first sector, sector 1 1722, a second sector, sector 2 1724, and a third sector, sector 3 1726. Line 1728 represents a sector boundary region between sector 1 1722 and sector 2 1724; line 1730 represents a sector boundary region between sector 2 1724 and sector 3 1726; line 1732 represents a boundary region between sector 3 1726 and sector 1 1722.

Cell 1 1702 includes a base station (BS), base station 1 1706, and a plurality of end nodes (ENs) in each sector 1710, 1712, 1714, Sector 1 1710 includes EN(1) 1736 and EN(X) 1738 coupled to BS 1706 through wireless links 1740, 1742, respectively; sector 2 1712 includes EN(1') 1744 and EN(X') 1746 coupled to BS 1706 through wireless links 1748, 1750, respectively; sector 3 1726 includes EN(1") 1752 and EN(X") 1754 coupled to BS 1706 through wireless links 1756, 1758, respectively. Similarly, cell M 1704 includes base station M 1708, and a plurality of end nodes (ENs) in each sector 1722, 1724, 1726. Sector 1 1722 includes EN(1) 1736' and EN(X) 1738' coupled to BS M 1708 through wireless links 1740', 1742', respectively; sector 2 1724 includes EN(1') 1744' and EN(X') 1746' coupled to BS M 1708 through wireless links 1748', 1750', respectively; sector 3 1726 includes EN(1") 1752' and EN(X") 1754' coupled to BS 1708 through wireless links 1756', 1758', respectively.

System 1700 also includes a network node 1760 which is coupled to BS1 1706 and BS M 1708 through network links 1762, 1764, respectively. Network node 1760 is also coupled to other network nodes, (e.g., other base stations, AAA server nodes, intermediate nodes, routers, and the like) and the Internet through network link 1766. Network links 1762, 1764, 1766 may be, for example, fiber optic cables. Each end node (e.g. EN 1 1736) may be a wireless terminal including a transmitter as well as a receiver. The wireless terminals (e.g., EN(1) 1736) may move through system 1700 and may communicate through wireless links with the base station in the cell in which the EN is currently located. The wireless terminals, (WTs) (e.g. EN(1) 1736) may communicate with peer nodes (e.g., other WTs in system 1700 or outside system 1700) through a base station (e.g., BS 1706) and/or network node 1760. WTs (e.g., EN(1) 1736) may be mobile communications devices such as cell phones, personal data assistants with wireless modems, etc.

Each base station performs tone subset allocation using a different method for the strip-symbol periods, from a method employed for allocating tones and determining tone hopping in the rest symbol periods (e.g., non strip-symbol periods). The wireless terminals can use a tone subset allocation method along with information received from the base station, (e.g. base station slope ID, sector ID information) to determine the tones that they can use to receive data and information at specific strip-symbol periods. The tone subset allocation sequence is constructed, to spread the inter-sector and inter-cell interference across each of the tones.

Figure 18:
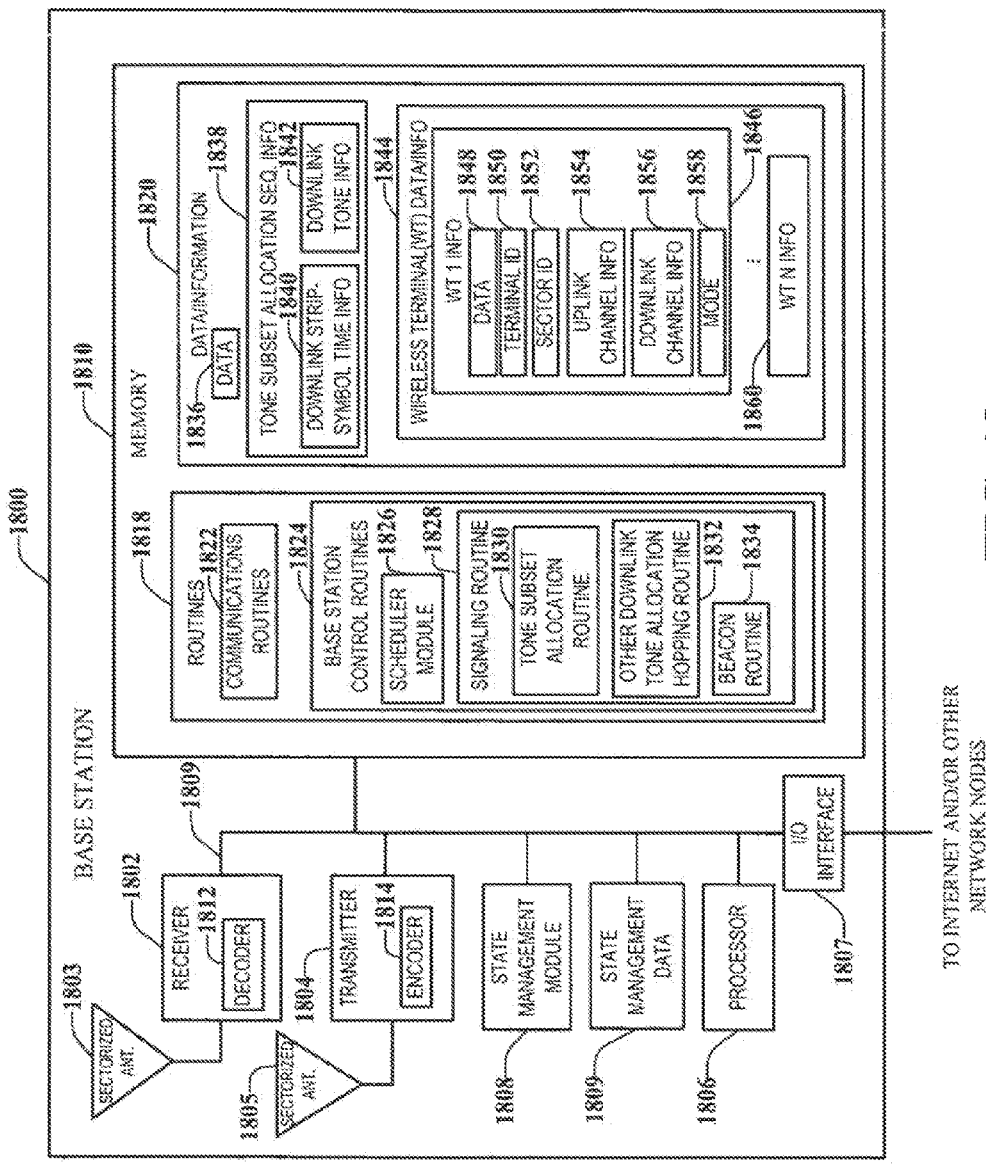
FIG. 18 illustrates an exemplary base station implemented in accordance with the embodiments presented herein.

FIG. 18 illustrates an exemplary base station implemented in accordance with the embodiments presented herein. Exemplary base station 1800 can implement a tone subset allocation sequence, with different tone subset allocation sequences generated for each different sector type of the cell. Base station 1800 may be used as any one of the base stations 1706, 1708 of the system 1700 of FIG. 17. The base station 1800 includes a receiver 1802, a transmitter 1804, a processor 1806, (e.g., CPU) an input/output interface 1807, a state management module 1808, a state management data 1809, and memory 1810 which are coupled by a bus 1809 over which the various elements 1802, 1804, 1806, 1807, and 1810 may interchange data and information.

Sectorized antenna 1803 coupled to receiver 1802 is used for receiving data and other signals (e.g., state information, access router listing) from wireless terminals transmissions from each sector within the base station's cell. Sectorized antenna 1805 coupled to transmitter 1804 is used for transmitting data and other signals, (e.g., control signals, pilot signal, beacon signals, etc.) to wireless terminals 1900 (see FIG. 19) within each sector of the base station's cell. In various embodiments, base station 1800 may employ multiple receivers 1802 and multiple transmitters 1804, (e.g., an individual receiver 1802 for each sector and an individual transmitter 1804 for each sector). The processor 1806, may be, for example, a general purpose central processing unit (CPU). Processor 1806 controls operation of the base station 1800 under direction of one or more routines 1818 stored in memory 1810 and implements the disclosed methodologies. Input/Output (I/O) interface 1807 provides a connection to other network nodes, coupling the base station 1800 to other base stations, access routers, AAA server nodes, etc., other networks, and the Internet. State management module 1808 can send and/or receive messages for state synchronization. State management data 1809 can include information regarding the state data, keys, QoS, wireless terminal identifier, and the like.

Memory 1810 includes routines 1818 and data/information 1820. Data/information 1820 includes data 1836, tone subset allocation sequence information 1838 including downlink strip-symbol time information 1840 and downlink tone information 1842, and wireless terminal (WT) data/info 1844 including a plurality of sets of WT information: WT 1 info 1846 and WT N info 1860. Each set of WT info, (e.g., WT 1 info 1846) includes data 1848, terminal ID 1850, sector ID 1852, uplink channel information 1854, downlink channel information 1856, and mode information 1858.

Routines 1818 include communications routines 1822 and base station control routines 1824. Base station control routines 1824 includes a scheduler module 1826 and signaling routines 1828 including a tone subset allocation routine 1830 for the strip-symbol periods, other downlink tone allocation hopping routine 1832 for the rest of symbol periods, (e.g., non strip-symbol periods), and a beacon routine 1834.

Data 1836 includes data to be transmitted that will be sent to encoder 1814 of transmitter 1804 for encoding prior to transmission to WTs, and received data from WTs that has been processed through decoder 1812 of receiver 1802 following reception. Downlink strip-symbol time information 1840 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1842 includes information including a carrier frequency assigned to the base station 1800, the number and frequency of tones, and the set of tone subsets to be allocated to the strip-symbol periods, and other cell and sector specific values such as slope, slope index and sector type.

Data 1848 may include data that WT1 1900 has received from a peer node, data that WT 1 1900 desires to be transmitted to a peer node, and downlink channel quality report feedback information. Terminal ID 1850 is a base station 1800 assigned ID that identifies WT 1 1900. Sector ID 1852 includes information identifying the sector in which WT1

1900 is operating. Sector ID 1852 can be used, for example, to determine the sector type. Uplink channel information 1854 includes information identifying channel segments that have been allocated by scheduler 1826 for WT1 1900 to use (e.g., uplink traffic channel segments for data, dedicated uplink control channels for requests, power control, timing control, etc.).

Each uplink channel assigned to WT1 1900 includes one or more logical tones, each logical tone following an uplink hopping sequence. Downlink channel information 1856 includes information identifying channel segments that have been allocated by scheduler 1826 to carry data and/or information to WT1 1900 (e.g., downlink traffic channel segments for user data). Each downlink channel assigned to WT1 1900 includes one or more logical tones, each following a downlink hopping sequence. Mode information 1858 includes information identifying the state of operation of WT1 1900, (e.g. sleep, hold, on).

Communications routines 1822 control the base station 1800 to perform various communications operations and implement various communications protocols. Base station control routines 1824 are used to control the base station 1800 to perform basic base station functional tasks (e.g., signal generation and reception, scheduling, and to implement the steps of the various methodologies including transmitting signals to wireless terminals using tone subset allocation sequences during the strip-symbol periods.

Signaling routine 1828 controls the operation of receiver 1802 with its decoder 1812 and transmitter 1804 with its encoder 1814. The signaling routine 1828 is responsible controlling the generation of transmitted data 1836 and control information. Tone subset allocation routine 1830 constructs the tone subset to be used in a strip-symbol period using the disclosed methodologies and data/info 1820 including downlink strip-symbol time info 1840 and sector ID 1852. The downlink tone subset allocation sequences will be different for each sector type in a cell and different for adjacent cells.

The WTs 1900 receive the signals in the strip-symbol periods in accordance with the downlink tone subset allocation sequences; the base station 1800 uses the same downlink tone subset allocation sequences in order to generate the transmitted signals. Other downlink tone allocation hopping routine 1832 constructs downlink tone hopping sequences, using information including downlink tone information 1842, and downlink channel information 1856, for the symbol periods other than the strip-symbol periods. The downlink data tone hopping sequences are synchronized across the sectors of a cell. Beacon routine 1834 controls the transmission of a beacon signal (e.g., a signal of relatively high power signal concentrated on one or a few tones), which may be used for synchronization purposes (e.g., to synchronize the frame timing structure of the downlink signal and therefore the tone subset allocation sequence with respect to an ultra-slot boundary).

Figure 19:
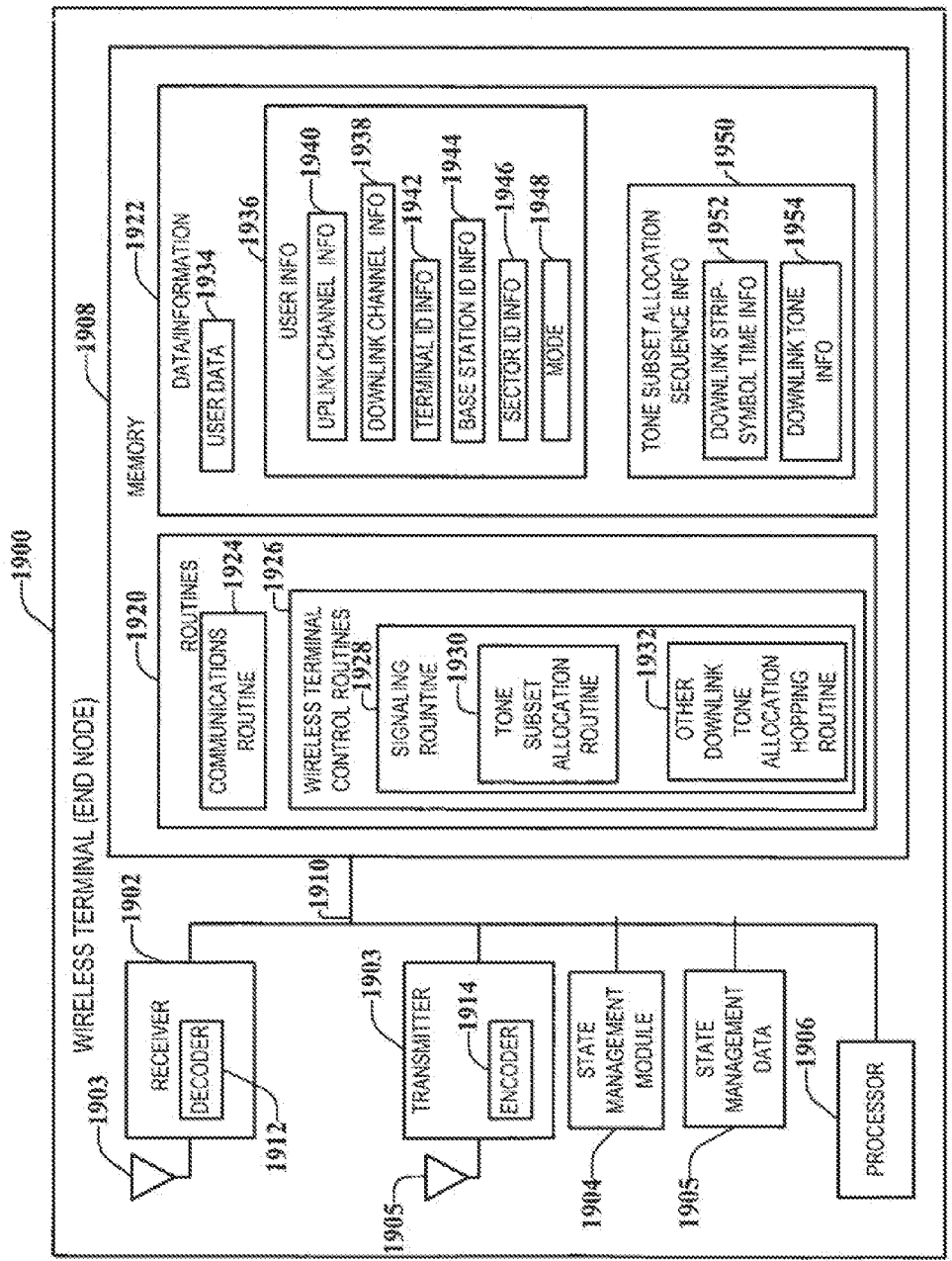
FIG. 19 illustrates an exemplary wireless terminal implemented in accordance with various embodiments presented herein.

FIG. 19 illustrates an exemplary wireless terminal (end node) 1900 which can be used as any one of the wireless terminals (end nodes) (e.g., EN(1) 1736, of the system 1700 shown in FIG. 17. Wireless terminal 1900 implements tone subset allocation sequences. The wireless terminal 1900 includes a receiver 1902 includes a decoder 1912, a transmitter 1903 including an encoder 1914, a state management module 1904 that can send/receive messages for state synchronization. Wireless terminal 1900 also includes a state management data 1905 that can include information regarding the state data, keys, QoS, wireless terminal identifier, and the like, and a processor 1906, and memory 1908 which are coupled by a bus 1910 over which the various elements 1902, 1903, 1904, 1905, 1906, 1908 can interchange data and information. An antenna 1903 used for receiving signals from a base station 1800 is coupled to receiver 1902. An antenna 1905 used for transmitting signals (e.g., to base station 1800) is coupled to transmitter 1903.

The processor 1906, (e.g., a CPU) controls the operation of the wireless terminal 1900 and implements methods by executing routines 1920 and using data/information 1922 in memory 1908. Data/information 1922 includes user data 1934, user information 1936, and tone subset allocation sequence information 1950. User data 1934 may include data, intended for a peer node, which will be routed to encoder 1914 for encoding prior to transmission by transmitter 1903 to base station 1800, and data received from the base station 1800 which has been processed by the decoder 1912 in receiver 1902. User information 1936 includes uplink channel information 1940, downlink channel information 1938, terminal ID information 1942, base station ID information 1944, sector ID information 1946, and mode information 1948.

Uplink channel information 1940 includes information identifying uplink channels segments that have been assigned by base station 1800 for wireless terminal 1900 to use when transmitting to the base station 1900. Uplink channels may include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1938 includes information identifying downlink channel segments that have been assigned by base station 1800 to WT 1900 for use when BS 1800 is transmitting data/information to WT 1900. Downlink channels may include downlink traffic channels and assignment channels, each downlink channel including one or more logical tone, each logical tone following a downlink hopping sequence, which is synchronized between each sector of the cell.

User info 1936 also includes terminal ID information 1942, which is a base station 1800 assigned identification, base station ID information 1944 that identifies the specific base station 1800 that WT has established communications with, and sector ID info 1946, which identifies the specific sector of the cell where WT 1800 is presently located. Base station ID 1944 provides a cell slope value and sector ID info 1946 provides a sector index type; the cell slope value and sector index type may be used to derive the uplink tone hopping sequences. Mode information 1948 also included in user info 1936 identifies whether the WT 1900 is in sleep mode, hold mode, or on mode.

Tone subset allocation sequence information 1950 includes downlink strip-symbol time information 1952 and downlink tone information 1954. Downlink strip-symbol time information 1952 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1954 includes information including a carrier frequency assigned to the base station 1800, the number and frequency of tones, and the set of tone subsets to be allocated to the strip-symbol periods, and other cell and sector specific values such as slope, slope index and sector type.

Routines 1920 include communications routines 1924 and wireless terminal control routines 1926. Communications routines 1924 control the various communications protocols used by WT 1900. Wireless terminal control routines 1926 controls basic wireless terminal 1900 functionality including the control of the receiver 1902 and transmitter 1903. Wireless terminal control routines 1926 include the signaling routine 1928. The signaling routine 1928 includes a tone subset allocation routine 1930 for the strip-symbol periods and an other downlink tone allocation hopping routine 1932 for the rest of symbol periods e.g., non strip-symbol periods). Tone subset allocation routine 1930 uses user data/info 1922 including downlink channel information 1940, base station ID info 1944 (e.g., slope index and sector type), and downlink tone information 1954 in order to generate the downlink tone subset allocation sequences and process received data transmitted from base station 1800. Other downlink tone allocation hopping routine 1930 constructs downlink tone hopping sequences, using information including downlink tone information 1954, and downlink channel information 1940, for the symbol periods other than the strip-symbol periods. Tone subset allocation routine 1930, when executed by processor 1906, is used to determine when and on which tones the wireless terminal 1900 is to receive one or more strip-symbol signals from the base station 1800. The uplink tone allocation hopping routine 1930 uses a tone subset allocation function along with information received from the base station 1800, to determine the tones in which it should transmit on.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for a state change synchronization with multi-party handshake, the method comprising:
   sending, from a wireless terminal, a first message to a first access router, wherein the first message includes a first indicator that identifies the first access router and a second indicator that identifies a second access router; and
   receiving, at the wireless terminal, an acknowledgment of the first message from the second access router,
   wherein the wireless terminal is an end node, and
   wherein a state change is a change in a state of the wireless terminal, and the first message indicates that there is the state change.

2. The method of claim 1, further comprising receiving, at the wireless terminal, a notification of the state change from the first access router before the sending the first message.

3. The method of claim 1, further comprising including, by the wireless terminal, the state of the wireless terminal in the first message.

4. The method of claim 3, wherein the state of the wireless terminal is at least one of a condition of a link between the wireless terminal and the first access router, a terminal identification, a security key, a quality of service configuration, an authorization parameter, and a timer associated with system use.

5. The method of claim 1, further comprising:
   determining, by the wireless terminal, whether a pre-defined period has elapsed before the acknowledgment of the first message is received; and
   resending, from the wireless terminal, the first message to the first access router if the pre-defined period has elapsed before the acknowledgment is received.

6. The method of claim 1,
   wherein the first access router is one of a base station, an access point, a packet data serving node (PDSN), and a gateway general packet radio services (GPRS) support node, and
   wherein the second access router is one of a base station, an access point, a packet data serving node (PDSN), and a gateway general packet radio services (GPRS) support node.

7. The method of claim 1, wherein sending the first message comprises sending the first message over an air link.

8. An apparatus that facilitates a state synchronization among a plurality of access routers, the apparatus comprising:
   a processor configured to transmit a communication to a first access router, wherein the communication includes a first address of a first access router and a second address of a second access router; and
   a receiver configured to receive a completion message from the second access router,
   wherein the apparatus a wireless terminal which is an end node, and
   wherein a state change is a change in a state of the apparatus, and the communication indicates that there is the state change.

9. The apparatus of claim 8, further comprising a memory configured to store information related to a plurality of access routers in communication with the apparatus.

10. The apparatus of claim 8, further comprising:
    a monitor configured to determine whether a specified period has elapsed before the completion message is received,
    wherein the processor is configured to send a second communication to the first access router if the specified period has elapsed before the completion message is received, wherein the second communication indicates that there is the state change.

11. The apparatus of claim 8, wherein the communication includes the state of the apparatus.

12. The apparatus of claim 8, wherein the processor is configured to transmit the communication in response to a notification of the state change received from the first access router.

13. The apparatus of claim 8, wherein the processor is configured to include an address of the apparatus in the communication.

14. The apparatus of claim 8, wherein the completion message is an acknowledgment of the communication indicating that the first and second access routers have been updated with state change information of the wireless terminal.

15. An apparatus for a state change synchronization, the apparatus comprising:
   means for conveying a first message to a first access router, wherein the first message includes a first address of the first access router and a second address of a second access router; and
   means for accepting at least a subset of the first message from the second access router,
   wherein the apparatus is a wireless terminal which is an end node, and
   wherein a state change is a change in a state of the apparatus, and the first message indicates that there is the state change.

16. The apparatus of claim 15, further comprising means for receiving a notification of the state change from the first access router prior to conveying the first message to the first access router.

17. The apparatus of claim 15, further comprising means for transmitting a state of the apparatus along with the first message.

18. The apparatus of claim 15, further comprising means for including in the first message a return address for the apparatus.

19. The apparatus of claim 15, further comprising:
   means for tracking an expiration of a specified period;
   means for determining if the subset of the first message is received from the second access router; and
   means for conveying a second message to the first access router, if the specified period has expired and the subset of the first message is not received from the second access router,
   wherein the second message indicates that there is the state change.

20. A non-transitory computer-readable medium having stored thereon computer-executable instructions for updating a plurality of access routers with state change information, wherein the instructions comprise:
   communicating, from a wireless terminal, a message to a first access router, wherein the message includes a state change of the wireless terminal, a first address of the first access router, and a second address of a second access router; and
   receiving, at the wireless terminal, an acknowledgment of the message from the second access router,
   wherein the wireless terminal is an end node.

21. The non-transitory computer-readable medium of claim 20, wherein the instructions further comprise including a return address of the wireless terminal in the message.

22. The non-transitory computer-readable medium of claim 20, wherein the instructions further comprise:
   monitoring a defined interval until the acknowledgment is received;
   identifying an expiration of the message if the defined interval passes before the acknowledgment is received; and
   sending, from the wireless terminal, a second message to the first access router, wherein the second message includes the state change of the wireless terminal, the first address of the first access router, and the second address of the second access router.

23. A processor configured to execute computer-executable instructions for communicating a state change to a plurality of access routers, wherein the instructions comprise:
   conveying a message to a first access router, wherein the message includes a first address of the first access router, a second address of a second access router, and a return address of a wireless device, and
   acquiring at least a subset of the message from the second access router,
   wherein the processor is a processor of the wireless device which is an end node, and
   wherein the state change is a change in a state of the wireless device, and the message to the first access router indicates that there is the state change.

24. The processor of claim 23, wherein the instructions further comprise appending a changed state of the wireless device to the message prior to conveying the message to the first access router.

25. The processor of claim 23, wherein the instructions further comprise:
   determining if the subset of the message is acquired before a specified interval has elapsed;
   transmitting a second message to the first access router, if the specified interval has elapsed, wherein the second message includes the first address, the second address, and the return address; and
   receiving at least a subset of the second message from the second access router.

26. A method for updating a plurality of access routers with terminal state information, the method comprising:
   receiving, at a first access router, a message from a wireless device, the message including a first address of the first access router, a second address of a second access router and a third address of a third access router; and
   routing at least a subset of the message to one of the second access router and the third access router,
   wherein the wireless device is an end node,
   wherein a state change is a change in a state of the wireless device, and the message received from the wireless device indicates that there is the state change, and
   wherein the subset of the message routed to the second and/or the third access router includes the second address and/or the third address.

27. The method of claim 26, further comprising sending a state change notification to the wireless device, wherein the message received at the first access router is a response to the sent state change notification.

28. The method of claim 26, further comprising removing, at the first access router, the first address from the message before routing the subset of the message to the second access router such that the subset of the message comprises the message with the first address removed.

29. The method of claim 26, further comprising appending the message with a state of the wireless device before sending the subset of the message routed to the second and/or to the third access router such that the subset of the message includes the state of the wireless device.

30. A non-transitory computer-readable medium having stored thereon computer-executable instructions for a state synchronization between a plurality of access routers utilizing multi-party handshake, wherein the instructions comprise:
- accepting, at a first access router, a communication from a wireless terminal, wherein the communication includes a wireless terminal address, a first indicator that identifies the first access router, a second indicator that identifies a second access router, and a third indicator that identifies a third access router; and
- transmitting at least a subset of the communication to the second access router,
- wherein the wireless terminal is an end node,
- wherein a state change is a change in a state of the wireless terminal, and the communication accepted from the wireless terminal indicates that there is the state change, and
- wherein the subset of the message transmitted to the second access router includes the state of the wireless terminal and the second and third indicators.

31. The non-transitory computer-readable medium of claim 30, wherein the instructions further comprise removing the first indicator, at the first access router, from the communication prior to transmitting the subset of the communication to the second access router.

32. The non-transitory computer-readable medium of claim 30, wherein the instructions further comprise conveying a state change notification to the wireless terminal, wherein the communication is accepted in response to the conveyed state change notification.

33. A processor that executes computer-executable instructions for a state change synchronization, wherein the instructions comprise:
- receiving a message from a wireless terminal, wherein the message includes a first address of a first access router, a second address of a second access router, and a third address of a third access router; and
- conveying at least a subset of the message to the second access router,
- wherein the wireless terminal is an end node,
- wherein the processor is a processor of the first access router,
- wherein a state change is a change in a state of the wireless terminal, and the message received from the wireless terminal indicates that there is the state change, and
- wherein the subset of the message conveyed to the second access router includes the second and third addresses.

34. The processor of claim 33, wherein the instructions further comprise notifying the wireless terminal of the state change, and the message is received in response to the notification.

35. The processor of claim 34, wherein the instructions further comprise:
- storing the state change in a retrievable format; and
- applying the stored state change during a subsequent communication.

36. The processor of claim 33, wherein the instructions further comprise:
- removing the first address from the message; and
- including the state of the wireless terminal and a destination address of the wireless terminal in the subset of the message prior to conveying the subset of the message to the second access router.

37. An apparatus that facilitates state information synchronization between access routers, the apparatus comprising:
- a processor configured to receive a communication from a previous access router, wherein the communication includes a state of a wireless device, a first address of a first access router, and a second address of a second access router;
- a memory configured to store information related to the state of the wireless device; and
- a transmitter configured to transmit at least a portion of the communication to the second access router,
- wherein the wireless device is an end node,
- wherein the apparatus is the first access router, and
- wherein the portion of the communication transmitted to the second access router includes the second address and the state of the wireless device.

38. The apparatus of claim 37, further comprising a modifier configured to mark the first address of the first access router as synchronized prior to the portion of the communication being transmitted to the second access router.

39. The apparatus of claim 37, wherein the information stored is a change to the state of the wireless device.

40. A non-transitory computer-readable medium having stored thereon computer-executable instructions for state synchronization among access routers, wherein the instructions comprise:
- acquiring a communication at a first access router from a previous access router, wherein the communication includes a first identification of the first access router and a second identification of a second access router, and a state of a wireless device; and
- transmitting, from the first access router, at least a subset of the communication to the second access router,
- wherein the wireless device is an end node, and
- wherein the portion of the communication transmitted to the second access router includes the second identification and the state of the wireless device.

41. The non-transitory computer-readable medium of claim 40, wherein the instructions further comprise storing the state of the wireless device at the first access router.

42. The non-transitory computer-readable medium of claim 40, wherein the instructions further comprise one of removing the first identification from the communication and marking the first identification as synchronized prior to transmitting the subset of the communication.

43. An apparatus that facilitates a state synchronization of a second access router, the apparatus comprising:
- a processor configured to receive a message that from a first access router, wherein the message includes a wireless device state information of a wireless device;
- a memory configured to store the wireless device state information in a retrievable format; and
- a transmitter configured to transmit at least a subset of the message to the wireless device as an acknowledgment of a successful receipt of the message,
- wherein the wireless device is an end node, and
- wherein the apparatus is the second access router.

44. The apparatus of claim 43, further comprising a modifier configured to mark as synchronized an address of the second access router included in the message prior to the subset of the message being transmitted to the wireless device.

45. The apparatus of claim 43, wherein the second access router in communication with the wireless device.

46. A processor configured to execute computer-executable instructions for a state synchronization of an access router, wherein the instructions comprise:
- accepting, at a second access router, a message from a first access router, wherein the message includes an address of the second access router and a changed state of a wireless device; and outputting to the wireless device at least a subset of the message, wherein the wireless device is an end node, and wherein the processor is a processor of the second access router.

47. The processor of claim 46, wherein the instructions further comprise modifying the message to mark the address of the second access router as synchronized.

48. The processor of claim 46, wherein the instructions further comprise modifying the message to include an acknowledgment that the message was successfully received at the first access router.

49. The method of claim 1, wherein the first access router and the second access router are among a plurality of access routers with which the wireless terminal can communicate without a handoff.

50. The apparatus of claim 8, wherein the first access router and the second access router are among the plurality of access routers with which the apparatus can communicate without a handoff.

51. The apparatus of claim 15, wherein the first access router and the second access router are among a plurality of access routers with which the apparatus can communicate without a handoff.

52. The non-transitory computer-readable medium of claim 20, wherein the first access router and the second access router are among the plurality of access routers with which the wireless terminal can communicate without a handoff.

53. The processor of claim 23, claim 20, wherein the first access router and the second access router are among the plurality of access routers with which the wireless device can communicate without a handoff.

54. The method of claim 26, wherein the first access router, the second access router and the third access router are among the plurality of access routers with which the wireless device can communicate without a handoff.

55. The non-transitory computer-readable medium of claim 30, wherein the first access router, the second access router and the third access router are among a plurality of access routers with which the wireless terminal can communicate without a handoff.

56. The processor of claim 33, wherein the first access router, the second access router and the third access router are among a plurality of access routers with which the wireless terminal can communicate without a handoff.

57. The apparatus of claim 37, wherein the first access router and the second access router are among a plurality of access routers with which the wireless device can communicate without a handoff.

58. The non-transitory computer-readable medium of claim 40, wherein the first access router and the second access router are among a plurality of access routers with which the wireless device can communicate without a handoff.

59. The apparatus of claim 43, wherein the first access router and the second access router are among a plurality of access routers with which the wireless device can communicate without a handoff.

60. The processor of claim 46, wherein the first access router and the second access router are among a plurality of access routers with which the wireless device can communicate without a handoff.

* * * * *